United States Patent [19]

Harris et al.

[11] 3,806,252
[45] Apr. 23, 1974

[54] HOLE MEASURER
[75] Inventors: James E. Harris, Bristol; Robert L. Watson, Bluff City, both of Tenn.
[73] Assignee: Eastman Kodak Company, Rochester, N.Y.
[22] Filed: July 10, 1972
[21] Appl. No.: 270,360

[52] U.S. Cl.............. 356/156, 356/237, 356/241, 356/167, 356/157, 250/219 DF, 250/219 LG
[51] Int. Cl............................................ G01b 11/00
[58] Field of Search .......... 356/156, 152, 199, 200, 356/239, 241, 167, 163, 157, 237; 250/219 DF, 219 LG, 219 R

[56] References Cited
UNITED STATES PATENTS

| 3,146,350 | 8/1964 | Topfer................... | 250/219 LG |
| 3,436,556 | 4/1969 | McCartney............... | 356/200 X |
| 3,585,395 | 6/1971 | Robkin et al........... | 250/219 DF |
| 2,899,747 | 8/1959 | Weir....................... | 356/171 |

OTHER PUBLICATIONS
Def. Pub. No. T.862,010, Heitz et al., 5/6/69.

Primary Examiner—Ronald L. Wibert
Assistant Examiner—Paul K. Godwin
Attorney, Agent, or Firm—Charles R. Martin

[57] ABSTRACT

Disclosed are methods and apparatus for rapidly, accurately and inexpensively measuring either the length, or, alternatively, both the length and diameter, of a hole in a substrate. According to this invention a first electromagnetic beam is positioned upon the hole at a first angle with regard to the axis of the hole and a second electromagnetic beam is positioned upon the hole at a second angle with regard to the axis of the hole. The quantity of energy in the portion of each of the beams that pass through the hole is sensed and the ratio of the sensed quanties of energy is determined. The ratio of the length and diameter of the hole are mathematically correlated in terms of the relationship between the first and second angles and the ratio of the sensed quanties of energy. The mathematical correlation is then solved for the ratio of the length and diameter. The length of the hole is then determined by multiplying the ratio of the length and diameter by a value reflective of the diameter of the hole, which can be either a nominal value or a value determined by solving a mathematical correlation of the diameter of the hole in terms of the energy in the portion of the first light beam passing through the hole.

38 Claims, 22 Drawing Figures

Fig. 1
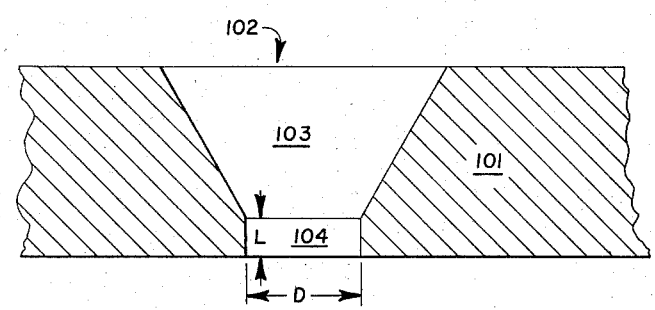
Fig. 2
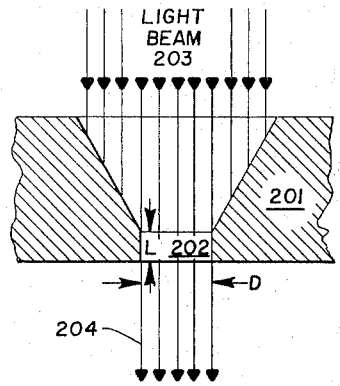
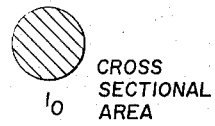
Fig. 3
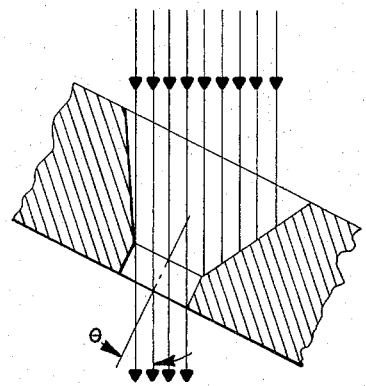

$$I_\theta = \frac{I_o}{\pi} \left\{ 2 \cos\theta \ \sin^{-1}\left[\sqrt{1-\left(\frac{L}{D}\right)^2 \tan^2\theta}\right] - 2\left(\frac{L}{D}\right) \sin\theta \ \sqrt{1-\left(\frac{L}{D}\right)^2 \tan^2\theta} \right\}$$

Where:

- $\theta$ = Angle between axis of capillary and light beam
- $I_\theta$ = Light intensity through the capillary when the angle between axis of capillary and light beam is $\theta$ degrees
- $I_o$ = Light intensity through the capillary when the angle between axis of capillary and light beam is zero degrees
- $L$ = Capillary length
- $D$ = Capillary diameter

*Fig. 4*

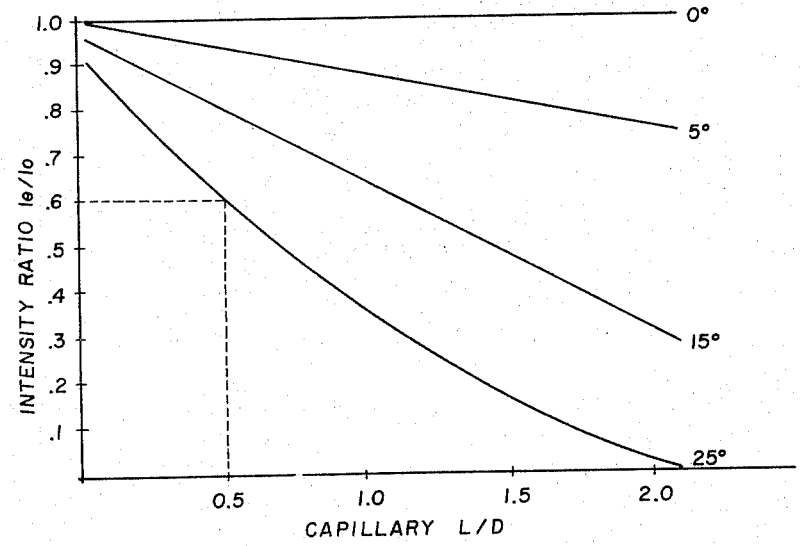

*Fig. 5*

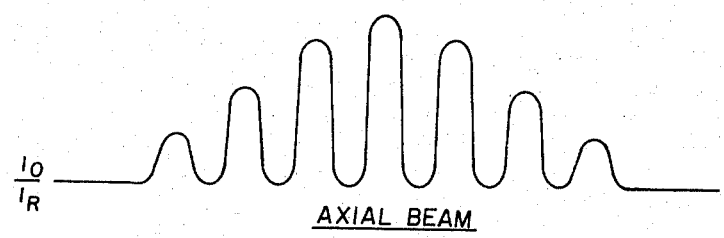
AXIAL BEAM
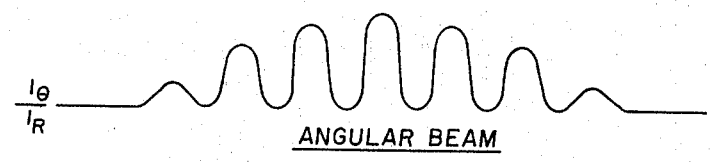
ANGULAR BEAM
*Fig. 11*
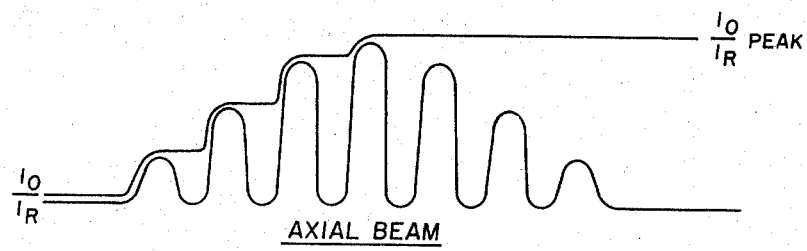
AXIAL BEAM
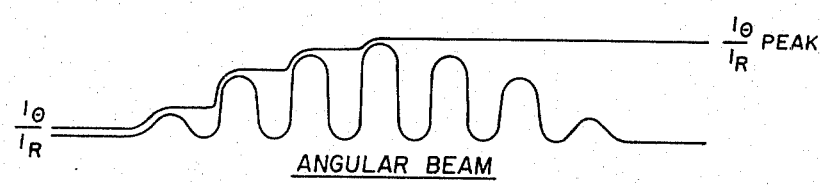
ANGULAR BEAM
*Fig. 12*

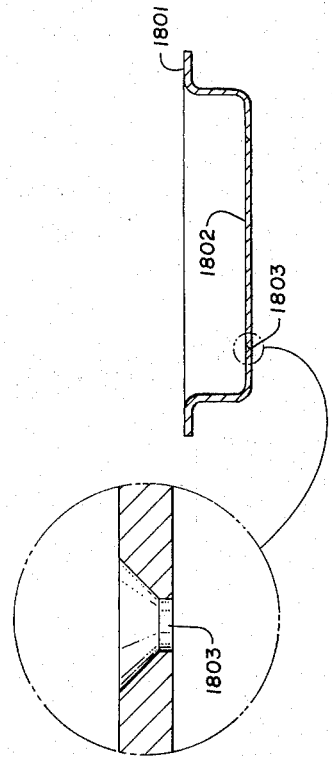
Fig. 18
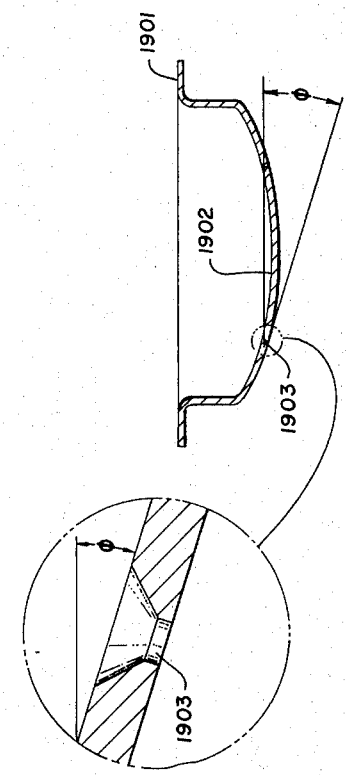
Fig. 19
| | Length | Diameter |
|---|---|---|
| Target | 50u | 100u |
| Tolerance | ±5u | ±1u |
| | |
|---|---|
| 48.3 | 99.3 |
| 50.2 | 99.2 |
| 52.8 | 99.5 |
| 54.2 | 99.2 |
| n57.1 | n98.8 |
| 50.2 | 99.1 |
| 51.5 | 99.0 |
| 50.0 | 99.3 |
| 48.5 | 99.2 |
| 48.8 | 99.1 |
| 48.4 | 99.3 |
| n44.6 | 99.9 |
| n44.0 | n97.2 |
| n43.2 | 99.3 |
| 42.4 | 99.2 |
| 42.2 | 99.4 |
| 42.9 | 99.5 |
| n42.7 | 99.6 |
| n41.8 | 99.3 |
| n44.1 | 99.3 |
| 45.4 | 99.3 |
| 46.9 | 99.3 |
Fig. 17

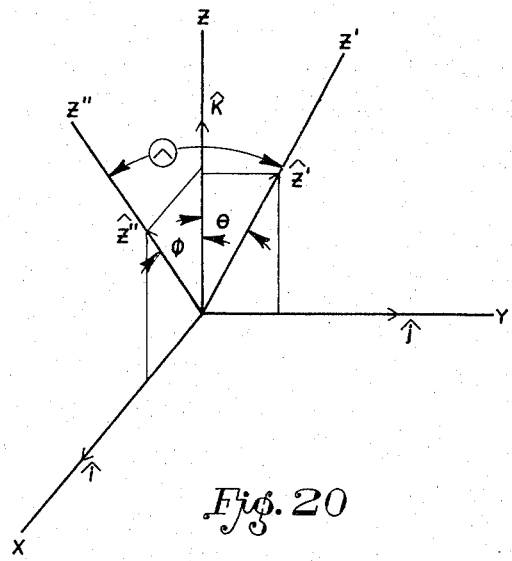
*Fig. 20*
$$\frac{I_{\phi,\theta}/I_0}{I_\phi/I_0} = \frac{2/\pi \left[ \cos\theta \, \sin^{-1}(\sqrt{1-(L/D)^2 \tan^2\theta}) - L/D \, \sin\theta \, \sqrt{1-(L/D)^2 \tan^2\theta} \right]}{2/\pi \left[ \cos\phi \, \sin^{-1}(\sqrt{1-(L/D)^2 \tan^2\phi}) - L/D \, \sin\phi \, \sqrt{1-(L/D)^2 \tan^2\phi} \right]}$$
*Fig. 21*
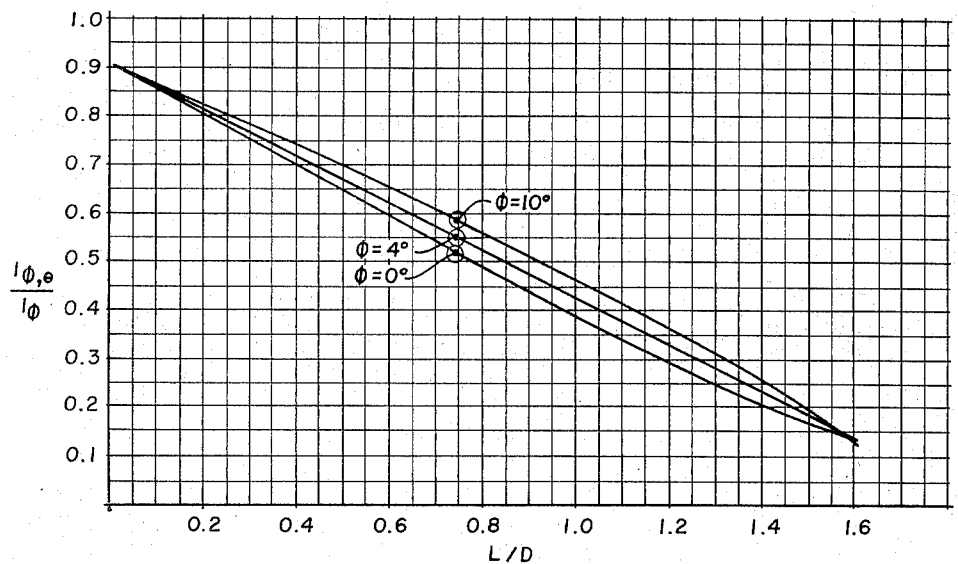
*Fig. 22*

HOLE MEASURER

This invention broadly relates to measuring either the length, or, alternatively, both the length and diameter, of a hole in a substrate. In one specific aspect this invention relates to measuring the length and diameter of small holes is thin substrates. In one still more specific aspect this invention relates to measuring the length and diameter of a right circular cylinder capillary passageway of an orifice in a spinneret used to extrude synthetic fibers.

Measurement of the length and diameter of holes in substrates is necessary in many industrial operations. When the holes are fairly large and the substrate fairly thick, such as a hole drilled to accommodate a bolt or bearing in a sheet or block of metal, measurement of the length and diameter of the hole can be accomplished using conventional linear measuring devices. When the holes become smaller and the substrate becomes thinner, such as in the manufacture of electrical circuit boards and air bearings, measurement becomes increasingly difficult until a point is reached that conventional linear measuring devices, such as rulers and tapes, can no longer be used. When the holes become very small and the substrates very thin, such as orifices in a spinneret used to extrude synthetic fibers or wave guides for microwave equipment, the problem is particularly acute.

As is well understood by those skilled in the art, the manufacture of synthetic fibers involves either melting a fiber forming polymer or alternatively dissolving a fiber forming polymer in a suitable solvent and thereafter extruding the molten or dissolved polymer through a plurality of very small holes, often called orifices, which are contained in a spinneret.

Referring to FIG. 1 there is illustrated a portion of a spinneret 101 containing an orifice 102 which comprises frusto-conical passageway portion 103 and right circular cylinder passageway portion 104 of diameter D and length L. Right circular cylinder passageway portion 104 is often called a capillary passageway, or merely a capillary, by those skilled in the art.

The length and diameter of the capillary are very important variables in the spinning of synthetic fibers, and particularly continuous filament synthetic fibers. Variations in the length and diameter of the individual capillaries in a spinneret can affect various fiber properties, such as dye takeup, tenacity, modulus, elongation, and denier per filament uniformity. Variations in the length and diameter of the capillary can also affect the start-up efficiency of new spinnerets and the rate of spinneret pressure increase with time.

Although it is quite important that the length and diameter of each capillary in the spinneret be within close tolerances, actual measurement of the length and diameter of the individual capillaries in a spinneret is exceedingly difficult because of the small size of the capillary. In many embodiments spinneret capillary diameters of 40 microns, or even less, and capillary lengths of 5 microns, or even less, are used commercially. Obviously even the most precise conventional linear measuring device would be of little value in measuring the length and diameters of capillaries of this size.

Although conventional linear measuring devices cannot be effectively used, there are several known methods of measuring the length and diameter of a capillary. Although these methods have been previously used in the art, these methods are unsatisfactory for one reason or another.

Many of these known methods are unsatisfactory because of the expense involved. Some of the instruments capable of performing only a few measurements an hour cost many thousands of dollars.

Other known methods are unsatisfactory because an excessive amount of time is required to perform the measurement. In some of these methods approximately 1 minute is required to accurately measure the length and diameter of an individual capillary. Since an individual spinneret can contain as many as 1,000 or more orifices, measurement of the length and diameter of all the capillaries can become quite time consuming.

Still other known methods are so inaccurate as to be unsatisfactory. Many manufacturing specifications demand that diameters be within a tolerance of ± 2 percent. These methods are incapable of measuring within tolerances of this nature.

Still another unsatisfactory feature of the prior art methods is that most methods cannot be used to measure both the length as well as the diameter of the capillary.

A further appreciation of the unsatisfactory character of the prior art methods can be obtained by considering the specific methods previously known and used to measure the length or the diameter of capillaries.

A first method involves casting an elastomeric mold of the spinneret orifices followed by microscopic measurement of individual capillary lengths. Accuracy is highly questionable and use of this method is quite slow. For example, only four spinnerets containing 25 orifices each, or 100 orifices total, can be measured in one day using this method.

A second method employs pressure drop across the spinneret to calculate capillary length. This method is fast; however, it gives average rather than individual capillary length values.

A third method utilizes a scanning electron microscope to measure capillary length and diameter. This method is by far the most accurate of the known methods; however, it also is quite slow, and the instrumentation is quite expensive. For example, only 10 spinnerets containing 20 orifices each, or 200 orifices total, can be measured in one day using this method.

A fourth method involves the use of a light microscope to measure the diameter of capillaries. Although this method is relatively accurate, it is quite slow. Only about 300 total orifices can be measured in one day using this method.

Presently there is no known method or apparatus to rapidly, accurately and inexpensively measure both the length and diameter of a capillary in a spinneret.

Accordingly, it is an object of this invention to rapidly, accurately and inexpensively measure either the length, or, alternatively both the length and diameter, of a hole in a substrate.

Another object of this invention is to rapidly, accurately and inexpensively measure either the length, or, alternatively both the length and diameter, of a small hole in a thin substrate.

Still one other object of this invention is to rapidly, accurately, and inexpensively measure either the length, or, alternatively both the length and diameter, of a right circular cylinder capillary in a spinneret.

Other objects, advantages and features of this invention will be readily apparent to those skilled in the art from the following description, drawings and appended claims.

The invention will now be described in terms of one specific aspect wherein the invention is used to measure the length and diameter of a right circular cylinder capillary portion of an orifice in a spinneret used to extrude synthetic filaments. Although the invention will be described in terms of this one specific aspect it will be recognized by those skilled in the art that the invention is not in any way to be limited to this specific aspect and, in a broader sense, the invention can be used to measure the length and diameter of small holes in thin substrates and can, in a still broader sense, be used to measure the length and diameter of a hole in a substrate.

In broad summary this invention comprises directing a first electromagnetic beam through the hole to be measured at a first angle with regard to the axis of the hole, measuring the quantity of energy in the portion of the first electromagnetic beam that passes through the hole, directing a second electromagnetic beam through the same hole at a second angle with regard to the axis of the hole, measuring the quantity of energy in the portion of the second electromagnetic beam that passes through the hole, determining the ratio of the two measured quantities of energy, correlating the ratio of the length of the hole and the diameter of the hole in terms of the ratio of the two measured quantities of energy and the relationship between the first and second angles, determining the ratio of the length of the hole to the diameter of the hole by solving the correlation, and determining the value of the length of the hole by multiplying the ratio of the length to diameter by a value reflective of the nominal diameter of the hole. In an optional embodiment the diameter of the hole is determined by correlating the energy in the portion of the first electromagnetic beam passing through the hole with the diameter of the hole and solving the correlation for the diameter of the hole. In this embodiment, the determined diameter can be used in place of the nominal diameter for determining the length of the hole.

In one specific embodiment of this invention a first laser beam is optically positioned upon a right circular cylinder capillary of an orifice in a spinneret and the position of the beam is substantially parallel to the axis of the spinneret. A second laser beam is optically positioned upon the capillary at a predetermined angle with regard to the axis of the spinneret. The energy in the portion of the first beam passing through the hole is ratioed with the energy in the portion of the second light beam passing through the hole. The ratio of length of the capillary to the diameter of the capillary is then correlated in terms of the predetermined angle and the ratio of the energy in the first and second light beams. The correlation is then solved for the ratio of the length to diameter since the ratio of the energies of two light beams and the predetermined angle are known. The length is then determined by multiplying the ratio of the length to diameter by either a nominal diameter or a diameter determined by solving a correlation of the diameter of the capillary in terms of the energy in the portion of the first light beam passed through the hole.

A further understanding of the invention is enhanced and facilitated by the attached figures which are to be understood to represent only one embodiment of the invention where a capillary in a spinneret is measured. As discussed earlier and will be readily apparent to one skilled in the art, the invention is not to be limited to this specific embodiment but is much broader in scope.

FIG. 1 is an elevation view in cross section of a portion of a spinneret having an orifice therein and a portion of the orifice is a capillary.

FIG. 2 is an elevation view in cross section of a light beam which is falling on an orifice of a spinneret and the light beam is oriented so that the light beam is parallel with regard to the axis of the capillary of the orifice.

FIG. 3 is the spinneret of FIG. 2 rotated so as to develop angle $\theta$ between the light beam and the axis of the capillary of the orifice.

FIG. 4 is an equation correlating the values $I_\theta$, $I_o$, L, D and $\theta$.

FIG. 5 is a plot of an equation of FIG. 4 solved for various values of the angle $\theta$.

FIG. 11 is a schematic representation of two signals formed in the electronic circuitry of FIG. 10 by dividing the axial beam voltage signal $I_o$ and the angular beam voltage signal $I_\theta$ by the reference beam voltage signal $I_R$.

FIG. 12 is a schematic representation of the peak voltage signals formed in the electronic circuitry of FIG. 10 by sensing and retaining the value of the maximum amplitude oscillations of signals $I_o/I_R$ and $I_\theta/I_R$ of FIG. 11.

FIG. 17 is an illustration of the printed readout of capillary length and diameter data determined using the third embodiment of the invention of FIG. 14.

FIG. 18 is a cross-sectional view in elevation of a newly manufactured spinneret having a flat face substantially perpendicular to the axis of the spinneret.

FIG. 19 is a cross-sectional view in elevation of a used reconditioned spinneret exaggerating the "bulge" that the face of the spinneret develops in service.

FIG. 20 is a schematic view of an arrangement of three dimensional axes illustrating the conditions used to develop an equation that corrects for the bulge of the face of the spinneret of FIG. 19.

FIG. 21 is the bulge correction equation corresponding to the arrangement of the axes of FIG. 20.

FIG. 22 is a plot of the equation of FIG. 21 solved for $\theta = 25°$ and $\phi = 0°$, $4°$ and $10°$.

Figure 6:
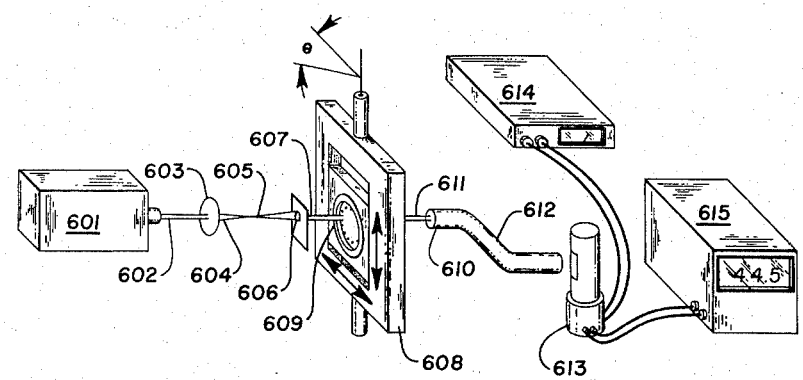
FIG. 6 is a schematic isometric illustration of a first embodiment of this invention.

A broad understanding of this invention can be readily obtained by considering FIGS. 2–5.

Referring now to FIG. 2 there is shown spinneret 201 having capillary 202 of length L and diameter D oriented so that the axis of the capillary is parallel to light beam 203. Beam 203 can be conveniently through of as the "axial" beam. The orientation of beam 203 parallel with regard to the axis of capillary 202 allows only a circular cross-sectional portion 204 of beam 203 to pass through capillary 202. The total energy, or intensity, of light beam 204 is designated I and a subscript indicating the angle between the axis of the capillary and the direction of beam 20 is then added. Since the angle between the axis of the capillary and the direction of beam 203 is zero, beam 203 is the axial beam and the designation for the energy in beam 204 is $I_0$. Since the energy $I_0$ in beam 204 is proportional to the cross-sectional area of beam 204 and the area of a circle is proportional to the square of the diameter of the circle, therefore $$D^2 \alpha I_0$$

or $$D = K \sqrt{I_0}$$

Referring now to FIG. 3 there is shown the spinneret of FIG. 2 rotated to develop angle $\theta$ between the axis of the capillary and the direction of the light beam. When the capillary is tilted through angle $\theta$ the cross-sectional area of the beam coming through the capillary decreases, going from a circle, as shown in FIG. 2, to a near elliptical shape, as in FIG. 3. This beam that is at an angle with regard to the axis of the capillary can conveniently be thought of as the "angular" beam and the energy in the portion of the beam passing through the hole is designated $I_\theta$. This transition from a circular to near elliptical shape results in the energy in the beam passing through the capillary decreasing from $I_0$ to $I_\theta$. Since $I_0$, $I_\theta$, L, D and $\theta$ are interrelated, the relationship can be expressed broadly as $$I_\theta = \text{function of } I_0, L, D \text{ and } \theta$$

and can be expressed specifically by the equation shown in FIG. 4.

The equation of FIG. 4 is derived by considering a right circular cylinder of radius r and length $L = 2a$, with its major axis of symmetry lying along the z coordinate axis. When viewed along the z axis the cylinder is seen in cross section as a circle with area $A_0 = \pi r^2$. If the cylinder is rotated about the x axis through an angle $\theta$, and again viewed along the z axis what is seen is the area $A_\theta$ which is formed by the intersection of two ellipses which are the projections of the cylinder ends upon the x-y plane. The equation of the ellipse passing through the first quadrant is $$y(x) = \cos\theta \ \sqrt{r^2 - x^2} - a \sin\theta$$

and the area $A_\theta$ can be defined by the equation $$A_\theta = 4 \int_0^{x_m} y(x) dx$$

where $$x_m x(y)|_{y=0} = \sqrt{r^2 - a^2 \tan^2 \theta}.$$

Integration of the equation for $A_\theta$ yields the equation $$A_\theta = 2r^2 \cos\theta \ \sin^{-1}\left[\frac{\sqrt{1-(a^2/r^2)\tan^2\theta}}{\sqrt{r^2 - a^2 \tan^2\theta}}\right] - 2a \sin\theta$$

One then assumes the energy in the portion of the beam passing through the hole for any particular angle to be proportional to the cross-sectional area of the portion of the beam passing through the hole, therefore $$I_\theta / I_0 = A_\theta / A_0$$

or $$I_\theta / I_0 = 2/\pi \{\cos\theta \sin^{-1}[\sqrt{1-(L/D)^2 \tan^2\theta}] - L/D \sin\theta \ \sqrt{1-(L/D)^2 \tan^2\theta}\}$$

where the substitutions $L = 2a$ and $D = 2r$ have been made.

If the equation correlation $I_\theta / I_0$ with L/D and $\theta$ is then solved at known angles of $\theta$, curves such as shown in FIG. 5 are obtained. Using the curves of FIG. 5 the capillary length to diameter ratio L/D may be determined by measuring intensity ratio $I_\theta / I_0$ at a fixed angle, such as 25°. For example, an intensity ratio of 0.6 at a tilt angle of 25° yields a length to diameter ratio of 0.5. Multiplication of L/D by nominal capillary diameter, or by diameter as determined from the previously described square root relationship of $I_0$ and D, gives capillary length L.

Referring now to FIG. 6, there is illustrated a first embodiment of this invention. In this embodiment of the invention a first intensity measurement is taken where the angle between the axis of the capillary and the light beam is zero as illustrated in FIG. 2. The capillary is then tilted through angle $\theta$ as in FIG. 3 and a second intensity measurement is taken.

In FIG. 6, a means 601 generates a laser beam 602 which is directed through a long focal length lens 603 to form beam 602 into converging beam 604 and diverging beam 605. In the embodiment of FIG. 6, means 601 can comprise a Model 200 0.6 mw helium laser manufactured by the University Laboratories Company. In the embodiment of FIG. 6, long focal length lens 603 can comprise a 132 millimeter focal length convex lens.

Diverging beam 605 and circular aperture 606 are positioned so that the center of beam 605 and the center of aperture 606 are substantially coincident. In the embodiment of FIG. 6, aperture 606 can be a 1.5 millimeter aperture. Convex lens 603 and aperture 606 are used to separate the center portion 607 of beam 605 from the outer portion of beam 605. Only the center portion 607 of beam 602 is to be used further because the energy distribution across beam 602 is somewhat bell shaped and elimination of the outer portion of the beam with lower energy results in the higher and more uniform energy center portion 607 of beam 602 passing through aperture 606 and being available for further use.

Still referring to FIG. 6, a spinneret holder 608 is adapted to retain spinneret 609 and is supported by a suitable frame which is adapted to allow spinneret 609 to be positioned so that the center of a capillary is coincident with the center of beam 607 and the axis of the capillary is parallel to the axis of beam 607. Holder 608 is further adapted to rotate spinneret 609 so as to position the other capillaries in beam 607 for subsequent measurement.

Diffuser 610 is positioned so that the portion 611 of beam 607 that passes through the spinneret capillary, which can be $I_o$ or $I_\theta$, is incident thereon. In the embodiment of FIG. 6, diffuser 610 can comprise a 3/16 inch diameter optical diffuser.

Diffuser 610 diffuses beam 611 and is attached to fiber optics tube 612 which communicates diffused beam 611 to photomultiplier 613 which is powered by power supply 614. In the embodiment of FIG. 6, fiber optics tube 612 can comprise a ⅛ inch diameter fiber optics tube of the type well known in the art. In this embodiment photomultiplier 613 can comprise a type 931A photomultiplier manufactured by the Radio Corporation of America and can be powered by a Model 6515A power supply manufactured by the Hewlet-Packard Corporation.

Photomultiplier 613 senses the quantity of energy of beam 611, which can be the value $I_o$ or $I_\theta$, and generates an electrical signal having a voltage reflective of the magnitude of the sensed quantity of energy. This generated electrical signal is then communicated to volt meter 615 which provides a digital presentation of the communicated voltage. In the embodiment of FIG. 6, volt meter 615 can comprise a Model 333 digital volt meter manufactured by the Honeywell Corporation. Other means to sense the energy of the beam and generate a voltage signal reflective of the magnitude of the sensed energy are fully within the scope of the invention.

In the embodiment of FIG. 6, means 601, lens 603 and aperture 606 can be positioned 830, 390 and 40 millimeters respectively from spinneret 609. In this embodiment, diffuser 610 can be positioned 12 millimeters from the face of spinneret 609.

To determine the length and diameter of an individual spinneret capillary using the first embodiment of the invention of FIG. 6 the following procedure can be utilized. Laser 601 and power supply 614 are operated. Spinneret 609 is manually positioned in holder 608 and any selected capillary of the spinneret is visually positioned in beam 607 by manipulation of holder 608. Holder 608 is then positioned so that the axis of beam 607 is parallel to the axis of the capillary, so as to create the value $I_o$ as in FIG. 2. Although beam 608 is continuously operated, this beam will be regarded as the first beam in this disclosure. A first digital presentation of volt meter 615, for example 44.5, is then observed and recorded by the operator. Holder 608 is then rotated to a selected angle $\theta$ so as to position the same capillary in beam 607 as shown in FIG. 3, and thereby create the value $I_\theta$. This beam will be regarded as the second beam in this disclosure. A second digital presentation of volt meter 615, for example, 26.7, is then observed and recorded by the operator. Since the first digital presentation represents $I_o$ and the second digital presentation represents $I_\theta$, then the quantity $I_\theta/I_o$ can then be calculated by the operator as 0.60. Assuming that the selected angle of rotation was 25°, the L/D ratio can be graphically determined by the operator to be 0.50 as illustrated in FIG. 5. Multiplication of this value by the diameter determined from the D and $I_o$ relation previously discussed, or by a nominal diameter, for example 46.0 microns, would allow the operator to determine the length of the capillary to be 23.0 microns.

Extremely accurate results can be obtained using the first embodiment of the invention. A 0.96 coefficient of correlation was obtained between capillary length data generated by use of the first embodiment of the invention of FIG. 6 and capillary length data generated by the previously described scanning electron microscope method. A test standard deviation of 0.8 microns was obtained for individual measurements.

Advantageously, the first embodiment of the invention of FIG. 6 can be used to generate highly accurate data much faster than the prior art methods. As an example, measurement of the length of the capillaries in a 15 capillary spinneret required approximately 15 minutes less time per capillary than the fastest prior art method of similar accuracy.

Although this invention is described in this disclosure in terms of several specific embodiments that measure spinneret capillaries, it will be understood that the invention is much broader in scope.

For instance, the invention is fully applicable for measuring a hole in a substrate. Examples of measuring a hole in a substrate include measuring a hole for a bolt in a sheet of metal or measuring a hole for pressfitting a bearing in a block of plastic or measuring the interior passageway of a piece of conduit. This invention is also fully applicable for measuring fairly small holes in fairly thin substrates such as in the manufacture of electrical circuit boards and air bearings. This invention is also fully applicable to measuring very small holes in very thin substrates other than capillaries in spinnerets. For example, the invention could be used to measure wave guides for microwave equipment as well as bearing holes for precision mechanical equipment such as watches and scientific testing equipment. This invention can be used to measure countless other kinds of holes in substrates.

Although this invention is particularly adapted to determine the length and diameter of holes having a circular cross-section, it is not to be regarded as limited thereto in any way. This invention can be used to measure the length and diameter equivalent of holes that are non-circular in cross-section, such as square, rectangular or triangular. Diameter equivalent is defined as the diameter of a circle whose cross-sectional area is equal to that of a hole being measured, whatever its geometrical shape may be. In this disclosure and claims the word "diameter" is defined to mean the diameter of a circular cross-section hole or the diameter equivalent of holes of other cross-sections. As will be readily appreciated by one skilled in the art the equations of FIG. 4 and FIG. 21 are valid only for a circular hole. Consequently, if a hole with a non-circular cross-section is to be measured the appropriate mathematics must be developed and used in place of the equation of FIG. 4 or the equation of FIG. 21. Although holes of unsymmetrical cross-section can be measured using this invention, preferably the hole has a symmetrical cross-section about an axis perpendicular to the hole since the mathematics is typically simplified using symmetrical holes. Although this invention can be used to measure holes of any particular diameter, the invention is particularly desirable for use in measuring holes of 1,000 microns or less because conventional linear measuring devices are of little value in making measurements this small.

As has been explained previously, this invention is broadly applicable to measuring a hole in a substrate. While in some embodiments the substrate can be a sheet-like member, such as a steel plate or sheet of plastic, the substrate could be of other than sheet-like character, such as a rectangular solid member or a cylindrical member. The axis of the hole in the rectangular solid member could be perpendicular or non-perpendicular to a face of the rectangular solid. The axis of the hole in the cylindrical member can be parallel to the axis of the cylinder, perpendicular to the axis of the cylinder or oriented in some other manner. The invention is applicable to substrates of countless other geometries.

In this invention the substrate can be of non-uniform thickness but preferably the substrate is of substantially uniform thickness. Although the substrate can be of various thicknesses the invention is particularly adapted to measuring holes in substrates less than 5 millimeters in thickness since conventional linear measuring devices are not desirable in making measurements this small.

In this invention it is desirable for both the axial and angular beams to be larger in cross sectional area than the hole to be measured and it is also desirable for the axial and angular beams to fully "cover" the hole as in FIGS. 2 and 3 so that the outer portion of the beams fall incident on the area of the substrate around the hole. It is desirable for the beams to be larger than the hole and fully cover the hole because the mathematics is simplified.

Although it is desirable for the beams to be larger than the hole, it is fully within the scope of this invention for the width of the beams to be smaller than the width of the hole. As an example, the axial beam can be rectangular in cross section and be positioned so that the long axis of the rectangle is greater than the diameter of the hole and the short axis of the rectangle is smaller than the diameter of the hole. The angular beam can be the same size as the axial beam and, because the long axis of the angular beam spans the hole, only a portion of the angular beam will pass through the hole. Of course in this situation the equation of FIG. 4 is no longer valid and a new correlation describing this situation can be developed by one skilled in the art.

Although it is desirable for the beams to fully cover the hole, it is fully within the scope of this invention for the beams to be positioned so that the edge of the beams falls across the hole. For example, the beams can be circular in cross section and the edge of the beams can fall inside the hole. As in the above case where the beams can be smaller than the hole, the equation of FIG. 4 is no longer valid if the edge of the beams falls across the hole and a new correlation can be developed by one skilled in the art.

It will be recognized by those skilled in the art that while the axial beam is preferably substantially parallel to the axis of the hole, the axial beam can be oriented in a position other than substantially parallel to the axis of the hole. For example, the axial beam can be oriented with regard to the axis of the hole at a slight angle of, say, 5°, or can be oriented at an angle of 10°, or even greater. The orientation of the axial beam at an angle with regard to the axis of the hole can be used on holes in either planar or nonplanar substrates, but is particularly adopted to be used where the holes to be measured are in a substrate which is a portion of a sphere as in the case of the face of a used spinneret.

The electromagnetic beam used in this invention can be of either visible or invisible character. For example, an X-ray beam can be used. Of course, the manner in which the beam is positioned upon the hole in the substrate would vary depending on the character of the beam since different frequency beams required different focusing techniques. In a preferred embodiment the beam is a visible beam, such as a laser beam, which has a substantially uniform energy distribution across the beam and is composed of substantially parallel rays.

According to this invention the quantity of energy in the portion of the electromagnetic beam passed through the hole is sensed and a signal reflective of the magnitude of the sensed quantity of energy is generated. The quantity of energy in the electromagnetic beams is preferably sensed by photoelectrically converting the electromagnetic energy into an electrical signal, but other methods are fully within the scope of this invention. The signal generated by sensing the quantity of energy is preferably an electrical signal having a voltage reflective of the magnitude of the sensed quantity of energy, but other signals, such as accoustical and mechanical signals, are fully within the scope of this invention.

The ratio of the signals generated by sensing the quantity of energy in the light beams is determined manually in the specific embodiment of FIG. 6, but other ways to determine the ratio of the signals can be used. As will be explained in detail with regard to the second and third embodiments, the ratio of the first and second signals can be determined and a third signal generated by electrically dividing the voltage of either the first or second electrical signal by the voltage of the other electrical signal and generating a third signal which is an electrical signal having a voltage reflective of the magnitude of the divided voltages of the first and second signals.

In the specific embodiment of FIG. 6 the ratio of the length and diameter is determined manually by solving the equation of FIG. 4 and generating a fourth signal reflective of the magnitude of the ratio of the length and diameter. As will be explained in detail in the second and third embodiments, the ratio of the length and diameter of the capillary can be determined by electrically solving the mathmatical correlation and the fourth signal generated is an electrical signal having a voltage reflective of the magnitude of the ratio of the length and diameter of the capillary.

In the specific embodiment of FIG. 6 the determination of the relationship between the first angle and the second angle involved only subtracting the second angle of 25° from the first angle of 0° since the angles are in the same plane. As will be subsequently explained in regard to measurement of capillaries in a "bulged" spinneret face, when the first and second angles are not in the same plane determination of the relationship between the first and second angle is more complicated but is fully within the scope of this invention.

Although this invention can be used to measure capillaries which are disposed in any manner on the face of the spinneret, it is particularly advantageous for use in measuring a plurality of capillaries which are disposed in a circle substantially concentric to the axis of the spinneret since the spinneret need only be rotated about the axis of the spinneret to advance the next capillary into the location for measurement.

In the specific embodiment of FIG. 6 spinneret holder 608 is particularly desirable for use, but it will be readily understood that a wide variety of other conventional means can be used to position a substrate having a hole therein within a location to measure the hole.

In the specific embodiment FIG. 6 the electromagnetic beam is optically positioned upon the hole to be measured using conventional optical lenses, but other ways to position the beam on the hole to be measured can be used. For example, use of electromagnetic beams of various frequencies may require different techniques and equipment for focusing the beams. Of course, it is fully within the scope of this invention not to pass the electromagnetic beam through any focusing devices, but merely position the beam on the hole by manipulating the means to generate the beam, or the substrate, or both.

In this invention it is necessary to determine the ratio of the length of the hole and diameter of the hole as well as the ratio of the energy in the portion of the axial beam passed through the hole and the energy of the portion of the angular beam passed through the hole. Although in the specific embodiment of FIG. 6 the ratio used was the ratio of L/D and $I_\theta /I_0$, the opposite ratio of D/L or $I_0/I_\theta$ could be used when appropriate changes are made to the equation of FIG. 4 and FIG. 21.

Although entirely satisfactory results can be obtained using the first embodiment of the invention illustrated in FIG. 6, substantial time is sometimes consumed by the operator is performing such steps as positioning the capillary within the light beam, observing and manually recording the digital readout, manually determining the intensity ratio $I_\theta /I_0$ and graphically solving for L/D.

Figure 7:
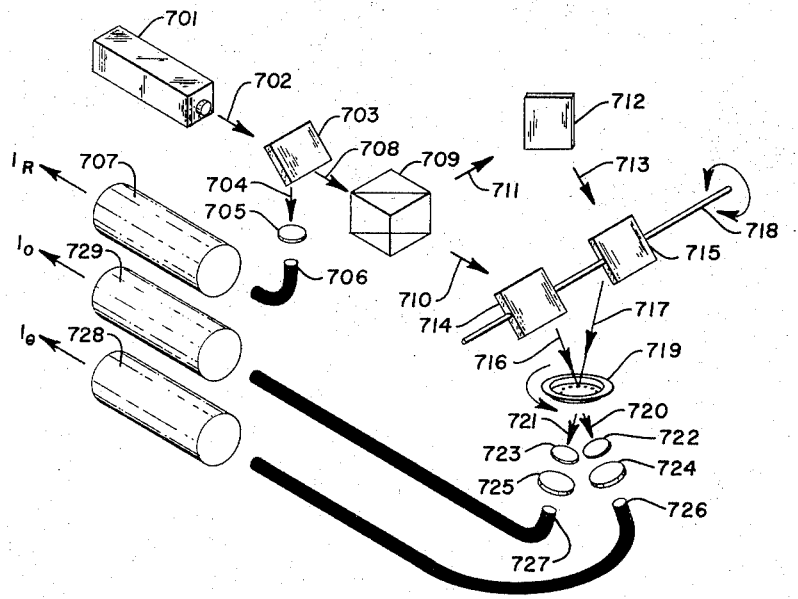
FIG. 7 is a schematic isometric illustration of a second embodiment of this invention.

A second embodiment of the invention shown in FIG. 7 eliminates many of the manual steps necessary to determine the length and diameter of a capillary using the first embodiment of FIG. 6. In the second embodiment instead of rotating the axis of the spinneret with respect to a light beam to produce the $I_\theta$ value, two separate light beams are directed through the capillary as shown in FIG. 8.

Figure 8:
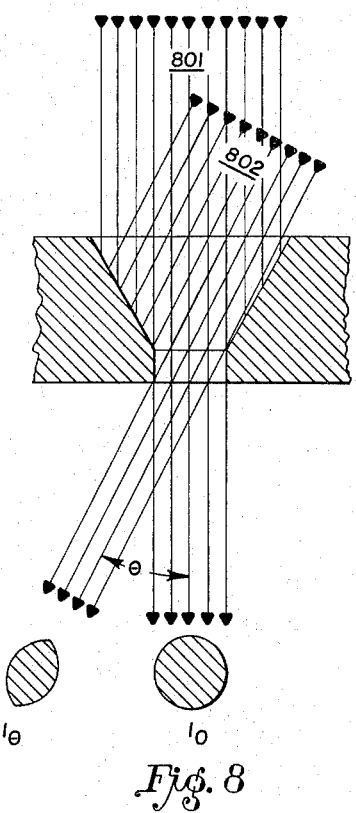
FIG. 8 is an elevation view in cross section of a spinneret orifice on which there is falling an axial light beam, which is oriented parallel to the axis of the capillary, and an angular light beam, which is oriented at angle $\theta$ with respect to the axis of the capillary.

In FIG. 8 an axial beam 801, parallel to the axis of the capillary, is directed through the capillary to produce the value $I_0$. Simultaneously, an angular beam 802 is directed through the same capillary, at an angle $\theta$ with regard to the axis of the capillary, so as to produce the value $I_\theta$.

Referring again to FIG. 7 there is illustrated a means 701 generating laser beam 702 which is directed against an optical flat glass plate 703 inclined with regard to beam 702. In the embodiment of FIG. 7, means 701 can comprise a Model 133 1.0 mw helium-neon laser, wave length 6,328A., manufactured by the Spectra-Physics Corporation. Other means to generate a laser beam can be used within the scope of this invention.

Figure 9:
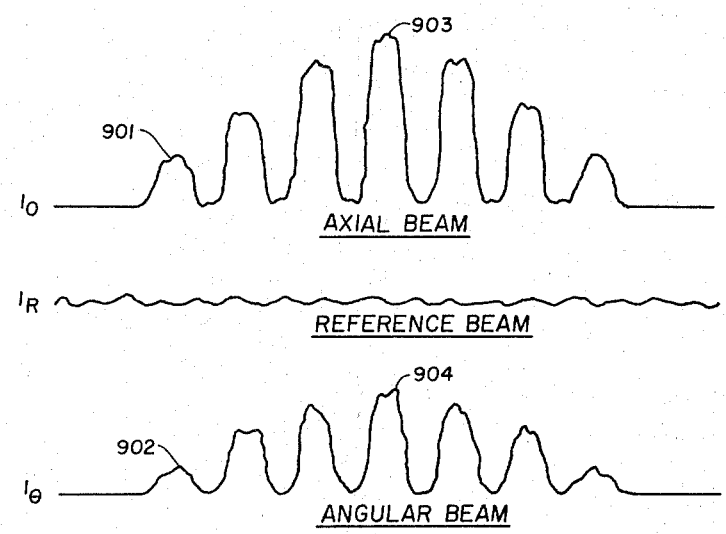
FIG. 9 is a schematic representation of the axial beam, reference beam, and angular beam voltage signals which are the outputs of the second embodiment of the invention illustrated in FIG. 7.

Plate 703 allows a large percentage 708 of beam 702 to pass through the plate and reflects a reference beam 704, which is a small percentage of beam 702, onto diffuser 705 and into fiber optics tube 706 which communicates the light from reference beam 704 into photomultiplier 707 which generages a reference beam signal, designated $I_R$, which is relatively constant as illustrated in FIG. 9. As will be subsequently explained in detail, the reference beam signal $I_R$ provides continuous monitoring of the laser output power.

Continuing with the second embodiment of the invention illustrated in FIG. 7, beam 708 is directed through a prism type beam splitter 709 which divides beam 708, and thereby generates beams 710 and 711 of approximately equal intensity. Beam 710 is parallel to beam 708 and beam 711 is perpendicular to beam 710. Beam 711 is then formed into beam 713 by reflecting beam 711 from a high efficiency first surface dielectric laser mirror 712 positioned at an angle to beam 711. The two beams 710 and 713, with a selected angular separation in the horizontal plane, for example 25°, are then reflected from two coplaner high efficiency first surface dielectric laser mirrors 714 and 715 to form coplaner beams 716 and 717 which, although now in a different plane, are also separated by the same selected angular separation as were beams 710 and 713. Beams 716 and 717 reside in a vertical plane substantially perpendicular to the face of spinneret 719 and are positioned so that beams 716 and cross at a capillary as illustrated in FIG. 8. Beam 716 is parallel to the axis of the capillary and can be thought of as the axial beam 801 illustrated in FIG. 8. Beam 717 is rotated from the paralleled position to the selected angle and can be thought of as the angular beam 802 illustrated in FIG. 8. The energy of the portion 720 of axial beam 716 that passes through the capillary is the value $I_0$ and the energy of the portion 721 of angular beam 717 that passes through the capillary is the value $I_\theta$.

Mirrors 714 and 715 are mounted on cylindrical shaft 718 for oscillatory movement about the axis of the shaft by suitable conventional means such as lever arm and motor driven cam arrangement. Spinneret 719 is rotationally mounted in a suitable conventional means which rotates the spinneret at a rate that is slow compared to the rate of oscillation of shaft 718. The slow rate of rotation of spinneret 719 provides a plurality of sweeps through each capillary as the spinneret rotates. Although the rate of rotation of the spinneret compared to the rate of oscillation of the sweep of the beams can vary widely with the desires and needs of the user, in one embodiment the spinneret is rotated at a speed in the range of 0.1 to 10 revolutions per minute and the beams are oscillated at a rate in the range of 10 to 1,000 hertz. The amplitude of oscillation of the beams can vary widely depending on the particular circumstances but can be about 3 mm in length in one embodiment.

Oscillation of shaft 718 causes beams 716 and 717 to sweep in the radial direction across the spinneret face thereby sweeping the beams across the spinneret capillary as the spinneret rotates. The combination of the radial oscillation of the beams and the spinneret rotation provide numerous consecutive passages of the beams through each capillary. Although the number of beam sweeps can vary widely, in one embodiment seven consecutive passages, or even three or less, can be used, while in the other embodiments as many as 30 consecutive passages, or even more, can be used. The combination of the beam sweep and spinneret rotation assure passage of the central maximum from axial beam 716 and angular beam 717 through the capillary without the need for precise manual centering.

Mechanical vibrations resulting from movement of shaft 718 and its driving and linkage mechanism can cause a level of vibration that is unsuitable in some instances. These mechanical vibrations can be reduced significantly by shockmounting the components, if desired. Also a galvanometer can be used to oscillate shaft 718 if desired. In one embodiment a Model G-108 galvanometer manufactured by General Scanning, Inc. can be used when powered by a Model A-100 driver amplifier manufactured by General Scanning, Inc.

Still referring to the embodiment of FIG. 7, below spinneret 719, and in line with the approximate beam axes of axial beam 716 and angular beam 717, are placed short focal length converging lens 722 and 723 which focus axial beam 720 and angular beam 721 onto diffusers 724 and 725. In the second embodiment lenses 722 and 723 can be 6 millimeters in focal length. Diffusers 724 and 725 as well as diffuser 705 can be a 3/16 inch diameter optical diffuser. Use of these converging lenses is desirable since unwanted sensitivity to spinneret positioning and orifice eccentricity can be reduced. Fiber optics tubes 726 and 727 positioned below the diffusers communicate the light from axial beam 720 and angular beam 721 to photomultipliers 728 and 729 which generate voltages $I_0$ and $I_\theta$. In the second embodiment fiber optics tubes 726 and 727, as well as fiber optics tube 706 can be a 1/8 inch fiber optics tube of the type well known in the art. Photomultipliers 728 and 729, as well as photomultiplier 707, can be a Type 4517 manufactured by the Radio Corporation of America. Other means to sense the energy of the beams and generate a voltage signal reflective of the magnitude of the sensed energy are fully within the scope of this invention.

Because beams 716 and 717 are oscillating along radii of the circle defined by the center of the orifices of spinneret 719, and further because spinneret 719 is rotating, the quantity of beams 716 and 717 that pass through the spinneret is oscillatory in character with the amplitude of the oscillation increasing as the spinneret rotates so as to convey a capillary into the sweep of the beams. The oscillations reach a maximum when the center of beams 716 and 727 are coincident with the center of the capillary, and the oscillation subsequently decreases to zero when the spinneret capillary rotates past the sweep of the beams and none of the light from beams 716 and 717 passes through the capillary.

In FIG. 9 there is shown a graphical representation of the output voltages $I_R$, $I_0$, and $I_\theta$ as the spinneret rotates so as to convey a capillary through seven consecutive sweeps of beams 716 and 717. As spinneret 719 rotates from a position where no portion of beams 716 and 717 fall on the capillary, to a position where a small portion of beams 716 and 717 pass through the capillary, there is created an initial voltage oscillation 901 from axial beam $I_0$ and an initial voltage oscillation 902 from angular beam $I_\theta$ which corresponds in time to oscillation 901 but is of smaller amplitude. As spinneret 917 continues to rotate while beams 716 and 717 are radially oscillating, a greater quantity of beams 716 and 717 pass through the capillary until peak oscillations 903 and 904 occur as the center of beams 716 and 717 fall coincident to the center of the capillary. Subsequent rotation of the spinneret produces decreasing voltage oscillations corresponding in character to the previously described increasing voltage oscillation. The ragged nonuniform character of signals $I_0$, $I_\theta$ and $I_R$ are caused by short term variations in the power output of beam 702. The wave forms $I_0$, $I_\theta$ and $I_R$ illustrated in FIG. 9 are then introduced into the electronic circuitry illustrated in FIG. 10.

Figure 10:
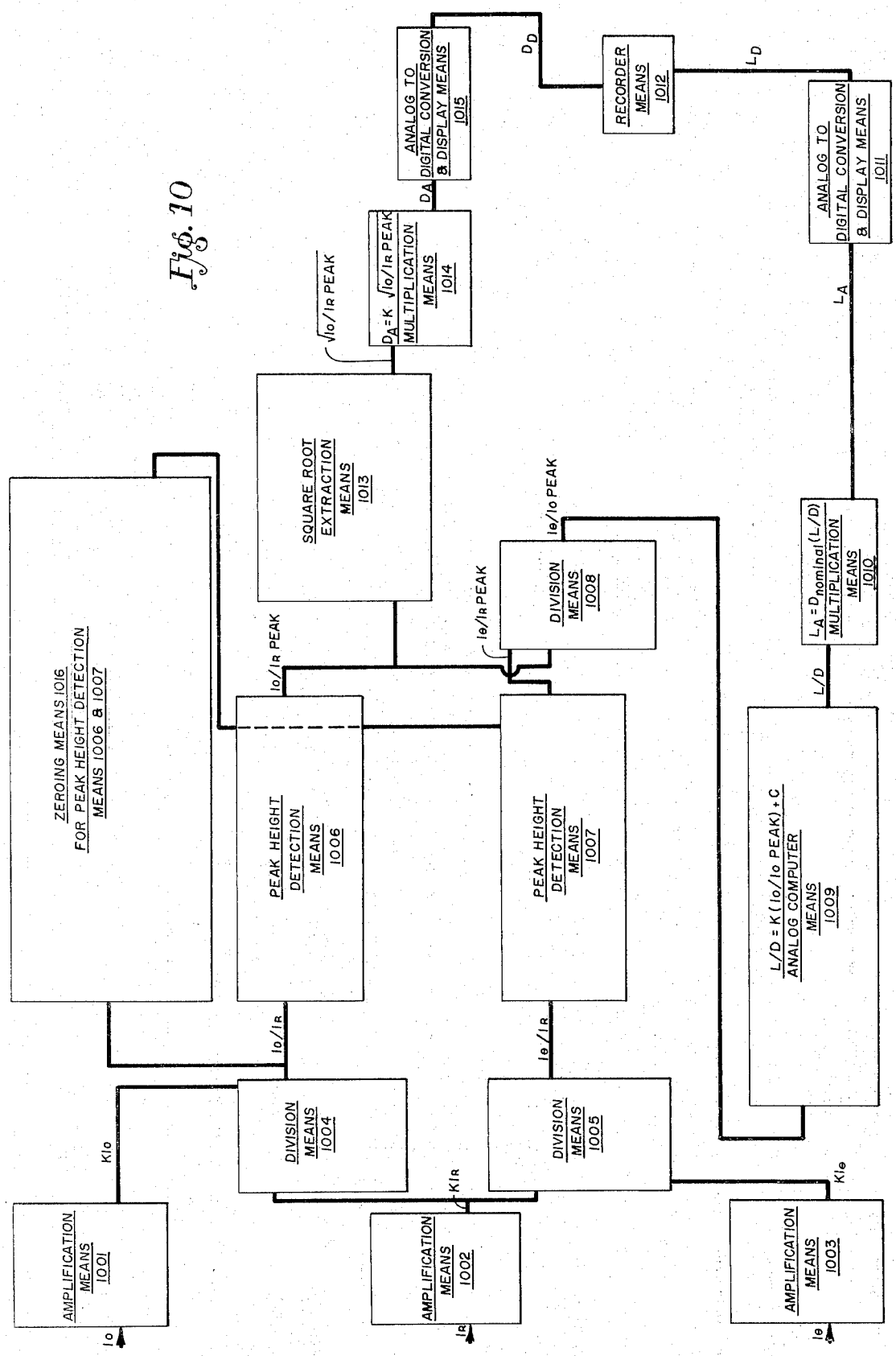
FIG. 10 is a schematic functional representation of the electronic circuitry of the second embodiment that determines the capillary length and diameter by solving the equation of FIG. 4 using as the input the voltage signals $I_o$, $I_\theta$ and $I_R$ of FIG. 9.

In FIG. 10, wave forms $I_0$, $I_R$, and $I_\theta$ are introduced into amplification means 1001, 1002, and 1003 to bring the voltage levels to a workable amplitude $KI_\theta$, $KI_R$, and $KI_0$. These signals are then fed through division means 1004 and 1005 which ratio both the angular and axial signals with the reference signal to give signals $I_0/I_R$ and $I_\theta/I_R$, as shown in FIG. 11. The signals $I_0$ and $I_\theta$ are divided by $I_R$ so as to compensate for the previously noted long and short term variations in the power of beam 702, which cause the wave forms $I_0$, $I_\theta$ and $I_R$ to be ragged as illustrated in FIG. 9. Thus, as shown in FIG. 11, the wave forms for the signals $I_0/I_R$ and $I_\theta/I_R$ are very smooth.

Referring back to FIG. 10, signals $I_0/I_R$ and $I_\theta/I_R$ are then introduced into peak height detection means 1006 and 1007. These detection means sense and retain the maximum amplitude oscillation of each signal as shown in FIG. 12 and produce signals $I_0/I_R$ Peak and $I_\theta/I_R$ Peak. Note that with each consecutive sweep of beams 716 and 717 through the capillary, the peak height voltages retained increase until passage of the central beam maximum 903 and 904 in FIG. 9. The peak height signals $I_0/I_R$ Peak $I_\theta/I_R$ Peak are then introduced into division means 1008 which yields the intensity ratio $I_\theta/I_0$ Peak.

As noted earlier, the intensity ratio $I_\theta/I_0$ Peak is related to the ratio L/D by the equation of FIG. 4. In the first embodiment of this invention illustrated in FIG. 6 this equation was solved graphically after the ratio $I_\theta/I_0$ was determined by dividing the observed value of $I_\theta$ by the observed value of $I_0$. As can be more fully appreciated by an examination of FIG. 5, the curves for angles of rotation of 25° and lower are quite linear in the region of lower L/D values, particularly up to an L/D value of about 0.7. Therefore, in the electronic circuitry of the second embodiment of the invention illustrated in FIG. 10, the signal $I_\theta/I_0$ Peak is introduced into analogue computer means 1009 which analogizes a $y = ax + b$ or $L/D = K(I_\theta/I_0) C + C$ or $L/D = -1.89 - 8(I_\theta/I_0) + 1.716$ linear approximation of the curve in FIG. 5 for the selected angle and analogue computer means 1009 solves for the value of L/D. The value L/D is then introduced into multiplier means 1010 and the valve L/D is multiplied by the nominal diameter of the capillary, $D_{nominal}$, to provide an analogue signal, $L_A$, having a voltage reflective of the length of the capillary. The analogue signal $L_A$ is then introduced into analogue to digital conversion and display means 1011 wherein the value of $L_D$ is visually displayed and a digital value reflective of the length of the capillary, $L_D$, is introduced to recorder means 1012 wherein the value $L_D$ is recorded. Thus, the final value of L has been determined.

Describing now the determination of the value D, as noted earlier the energy in beam $I_0$ is proportional to the cross-sectional area of the axial beam and the area of a circle is proportional to square of the diameter of a circle and therefore $D = K\sqrt{I_0}$ or $D = K\sqrt{I_0 I_R}$ Peak.

Referring again to FIG. 10 the signal $I_0/I_R$ Peak is introduced into square root extraction means 1013 which extracts the square root of $I_0/I_R$ Peak. The signal $\sqrt{I_0/I_R}$ Peak is then introduced into multiplication means 1014 and multiplied by an appropriate value of K to provide an analog signal, $D_A$, reflective of the orifice diameter D. The value of K can be determined by measuring standard holes of known diameter. The analog signal $D_A$ is then introduced into analog to digital conversion and display means 1015, wherein the value $D_D$ is displayed and a digital signal, $D_D$, is introduced into recorder means 1012 wherein the value of $D_D$ is recorded. Thus, the final value of D has been determined.

In another aspect (not shown) of this embodiment of the invention, the signal $D_A$ generated by multiplication means 1014 can be conducted to multiplication means 1010 and the value $L_A$ can then be determined by multiplying L/D by $D_A$ instead of $D_{nominal}$. Although the use of the $D_A$ value instead of $D_{nominal}$ value gives greater accuracy, the use of the $D_{nominal}$ value gives results that are entirely satisfactory for many applications.

As noted above, during measurement of a single capillary peak height detection means 1006 and 1007 sense and retain the highest amplitude of the oscillating voltages applied. As will be recalled, the apparatus of FIG. 7 measures succeeding capillaries by rotating spinneret 719 so as to rotate the measured capillary away from the sweep of beams 716 and 717 and rotate the next capillary to be measured into the sweep of the beams 716 and 717. Since peak height detecting means 1006 and 1007 retain the highest amplitude of the oscillating voltages applied, the retained voltage $I_0/I_R$ Peak and $I_\theta/I_R$ Peak must be reduced to zero voltage before the next succeeding capillary can be measured. In order to accomplish this zeroing function the apparatus of FIG. 10 can incorporate zeroing means 1016 for peak height detection means 1006 and 1007.

Zeroing means 1016 functions by sensing the absence of a signal $I_0/I_R$ from division means 1004 when spinneret 719 rotates so as to entirely remove the recently measured capillary from the sweep of beams 716 and 717. Responsive to the absence of a signal $I_0/I_R$, zeroing means 1016 generates a zeroing signal which is conducted to peak height detection means 1006 and 1007 thereby causing the voltage $I_0/I_R$ Peak and $I_\theta/I_R$ Peak to decay to zero. Peak height detection means 1006 and 1007 are then ready to sense and retain the amplitude of the oscillating increasing voltages $I_0/I_R$ and $I_\theta/I_R$ when the rotation of spinneret 719 psotions the next succeeding capillary to be measured within the sweep of beam 716 and 717.

Figure 13:
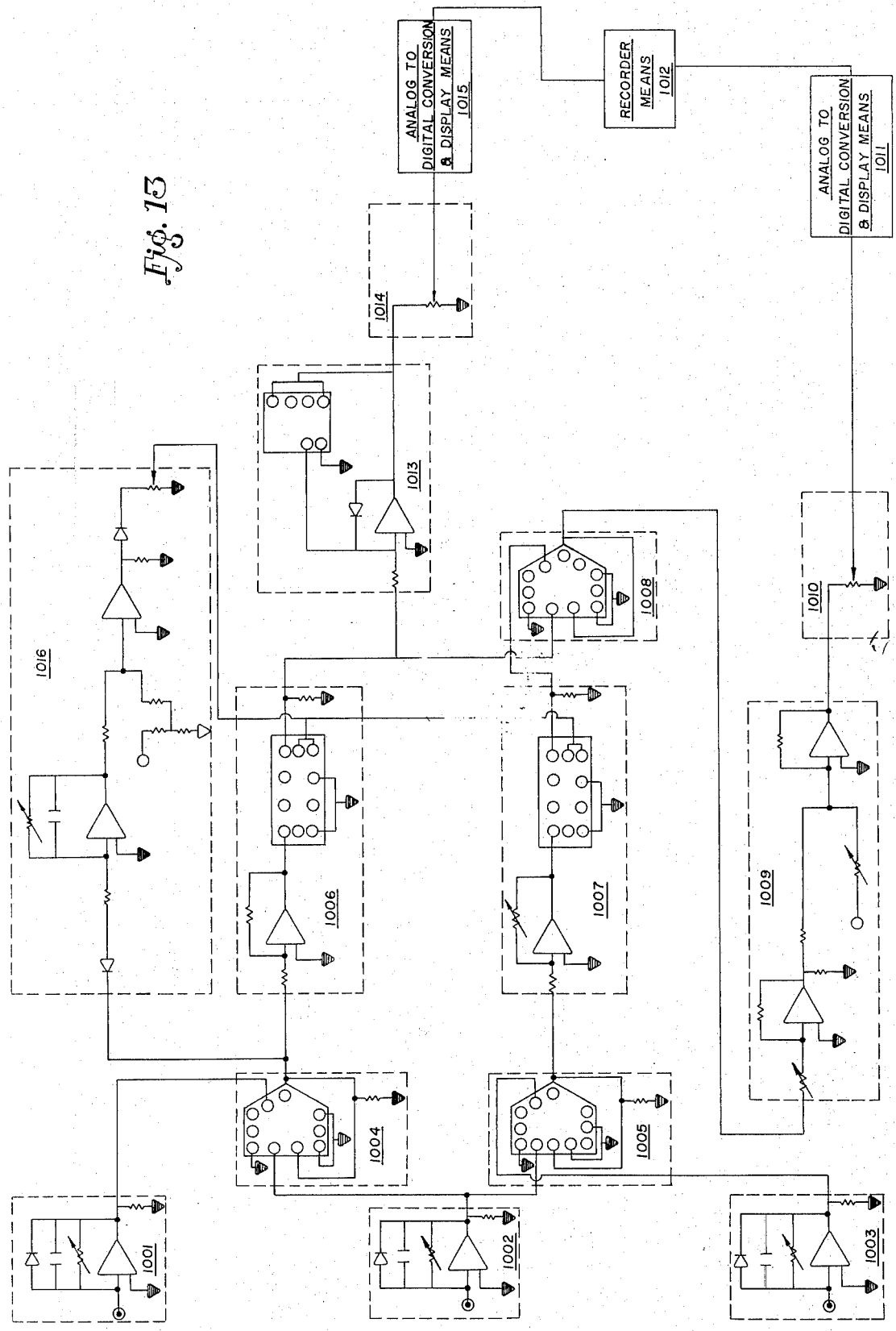
FIG. 13 is one specific embodiment of the circuitry described functionally in FIG. 10.

Referring now to FIG. 13 there is illustrated one specific embodiment of the functional circuitry illustrated in FIG. 10. It will be recognized that other specific embodiments of the functional circuitry of FIG. 10 can be used within the scope of this invention.

In FIG. 13 amplification means 1001, 1002 and 1003 comprise a Model 3129 amplifier manufactured by the Burr-Brown Corporation operating in conjunction with a parallel arrangement of a variable resistor, a capacitor and a diode. Other circuitry well known in the art can be used to provide the amplification function of amplification means 1001, 1002 and 1003.

The output signals from amplification means 1001, 1002 and 1003 are conducted to division means 1004 and 1005 which in the specific embodiment of FIG. 13 comprise a Model 4098 divider manufactured by Burr-Brown Corporation. Other division circuitry well known in the art can be used in place of the above described division means.

The signals $I_0/I_R$, and $I_\theta/I_R$ coming from division means 1004 and 1005 are conducted through peak height detection means 1006 and 1007. In the embodiment of FIG. 13, peak height detection means 1006 comprises the combination of a Model 3020 amplifier manufactured by the Burr-Brown Corporation and a Model 4084 peak height detecting module manufactured by the Burr-Brown Corporation. Peak height detection means 1007 is similar to peak height detection means 1006 except that the amplification function incorporates a variable resistor for ease of calibration.

The output signals from peak height detection means 1006 and 1007 are then conducted to division means 1008 which in the embodiment of FIG. 12 comprises a Model 4096 divider manufactured by the Burr-Brown Corporation. Other conventional circuitry could be used in place of the above specific embodiment of division means 1004 and 1005.

The output signal $I_\theta/I_0$ Peak from division means 1008 is then conducted to analogue computer means 1009. In the specific embodiment of FIG. 12 analogue computer means 1009 comprises a Model 3022 amplifier manufactured by the Burr-Brown Corporation which multiples the signal $I_\theta/I_0$ Peak by the value K and the value C is then added through a variable resistor to form the value K ($I_\theta/I_0$ Peak) + C which is the value L/D. The value L/D is then amplified by a Model 3022 amplifier manufactured by the Burr-Brown Corporation.

The value of amplified L/D is then conducted to multiplication means 1010 and in the specific embodiment of FIG. 13 and a variable resistor is used to multiply of the signal by the value $D_{nominal}$, so as to produce the signal $L_A$. If it is desired to multiply the L/D value by $D_A$ then suitable conventional circuitry can be used in place of the variable resistor. Other circuitry well known in the art could be used for multiplication means 1010.

The signal $L_A$ generated by multiplication means 1010 is then conducted to analogue to digital conversion and display means 1011 which in the embodiment of FIG. 12 comprises a Datascan Model 520-V3 digital panel meter manufactured by Datascan Corporation.

Analogue to digital conversion and display means 1011 generates a digital signal $L_D$ reflective of the length of the capillary and this signal is conducted to recorder means 1012 which in the embodiment of FIG. 12 comprises a Hewlett-Packard Model 5055A Digital Recorder manufactured by the Hewlett-Packard Corporation.

Still referring to FIG. 13, the signal $I_0/I_R$ Peak generated by peak height detection means 1006 is also conducted to square root extraction means 1013 which in the embodiment of FIG. 13 comprises the combination of a Model 3020 amplifier manufactured by the Burr-Brown Corporation operating in conjunction with a Model 9874 square root extractor manufactured by the Burr-Brown Corporation. Other conventional square root extracting circuitry could be used if desired.

The signal $\sqrt{I_0/I_R \text{ Peak}}$ generated by square root extraction means 1013 is then conducted to multiplication means 1014 wherein the value $D_A$, which is the analogue value reflective of the diameter of the capillary, is computed by a variable resistor which multiplies the value K by the value $\sqrt{I_0/I_R \text{ Peak}}$. Other multiplication circuitry of conventional design can be used if desired.

The signal $D_A$, which is the analogue expression of the diameter of the capillary, is then conducted to analogue to digital conversion and display means 1015 which in the embodiment of FIG. 12 comprises a Model 520-V3 Datascan digital panel meter manufactured by the Datascan Corporation.

The digital signal reflective of the diameter of the capillary, $D_D$, is then conducted to recorder means 1012 previously described.

In the embodiment of the invention in FIG. 12 zeroing means 1016 basically comprises a sliding integrator and a comparator using a Model 3022 amplifier manufactured by the Burr-Brown Corporation.

Results that are entirely accurate for many purposes can be obtained using the second embodiment of the invention illustrated in FIG. 7. Using the second embodiment of the invention an average test standard deviation of 0.51 microns can be obtained. A coefficient of correlation of capillary length measurements with the scanning electron microscope of 0.94 can be obtained using the second embodiment of this invention.

Calibration of the second embodiment of the invention can be conveniently accomplished by adjusting the ratio of $I_\theta$ /$I_0$ electronically to produce length and diameter readings on a standard capillary which conform to scanning electron microscope meansurements. In the course of measurements over extended periods of time, the calibration was observed to drift to the extent that recalibration was required at regular intervals of approximately one hour. This drift has, according to one theory, been attributed to differential rates of warmup and/or fatigue in the photomultipliers. Since the calibration technique required very minute adjustments in the ratio of $I_\theta$ /$I_0$, it was found that an improvement in reproducibility could be made by first calibrating the instrument as closely as possible and then measuring every hole in a standard spinneret. Corrections to the data were then made based upon the deviation of the average orifice length from a "standard" value.

The second embodiment of the invention can be used to rapidly generate measurements of capillary length and diameter. Using the second embodiment of the invention the length and diameter of a single spinneret containing 13 holes can be measured in only about 2 minutes. All capillaries of a double circle 38 hole spinneret can be measured in 6-8 minutes.

Although the second embodiment of the invention produces measurements that are entirely suitable for many purposes, it is more desirable in some instances to decrease mechanical vibrations in the system, decrease the periods of time between calibration, provide a print-out of the length and diameter data and also a print-out of those orifices that have out-of-tolerance lengths or diameters.

Figure 14:
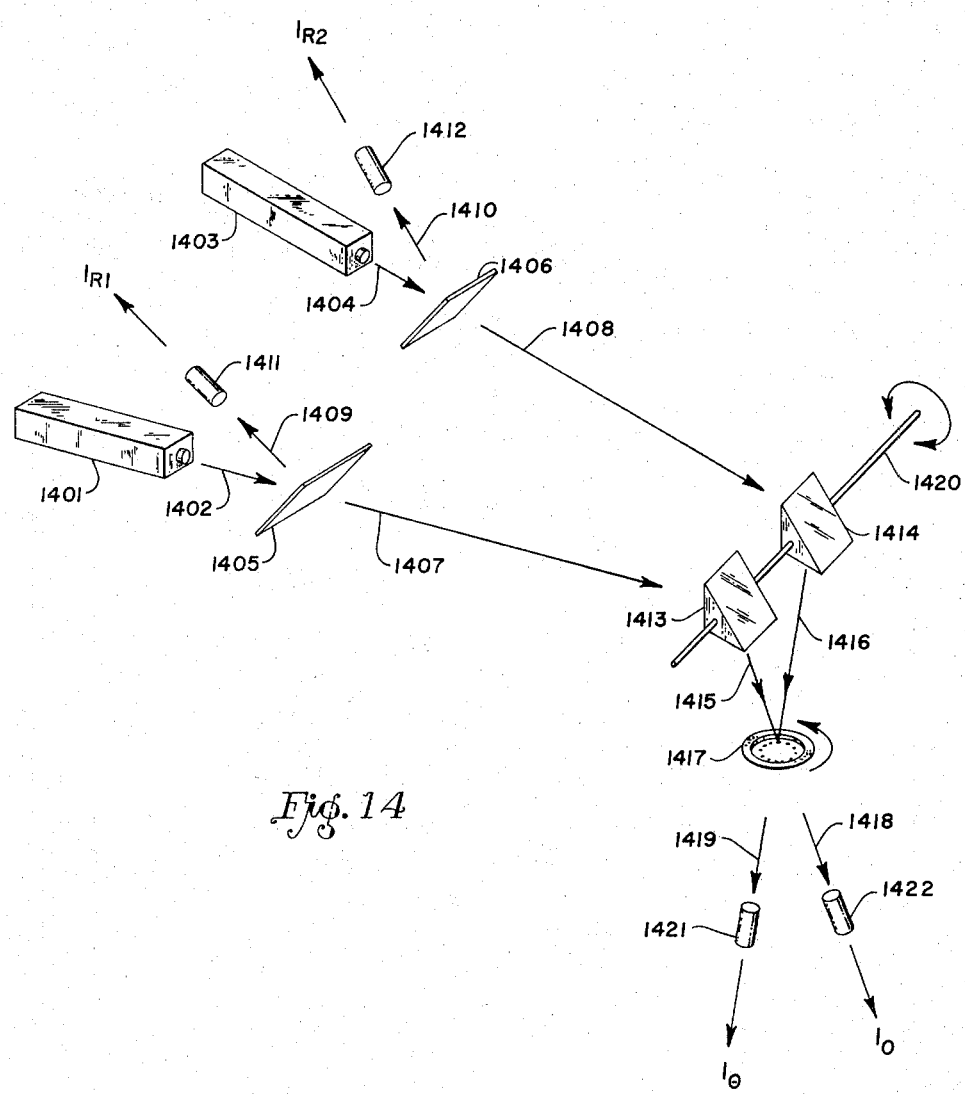
FIG. 14 is a schematic isometric illustration of a third embodiment of this invention.

A third embodiment of the invention shown in FIG. 14 has certain advantages over the second embodiment of the invention in that mechanical vibrations are reduced, periods of time between calibration are increased, and a printout of the determined length and diameter data, along with an out-of-tolerance printout, are provided.

Although accuracy of length and diameter data generated by the second embodiment of the invention are entirely suitable for many applications, cyclic variations in the data can occur. It is thought, according to one theory, that these cyclic variations in the data are related to uncompensated variations in the laser output power. Thus, while the *total* output power of the laser is quite state, the output power in any single plane of polarization is not constant and can vary by as much as 30 percent. This means that any optical member which polarized reflected light would give rise to cyclic variations in the intensity of the reflected beam. To minimize this effect, the single laser/beam splitter arrangement of the second embodiment of FIG. 7 can be replaced with two lasers, each with separate reference beams.

Referring now to FIG. 14 there is illustrated means 1401 generating laser beam 1402 and a similar means 1403 generating laser beam 1404 which is disposed 25° with respect to beam 1402. In the embodiment of FIG. 14, means 1401 and 1403 comprise a Model 133 1.0 mw helium neon laser manufactured by Spectra-Physics, Inc. Other means to generate a laser beam can be used within the scope of this invention.

To help compensate for the above described polarization effect the laser can be equipped with a magnetic polarization device such as the Option 01 arrangement for the Spectra-Physics laser. This device provides polarization of the beams to within one part in twenty.

Beams 1402 and 1404 are then directed against optical flat glass plates 1405 and 1406. Plates 1405 and 1406 allow a large percentage 1407 and 1408 of beams 1402 and 1404 to pass through the plate and reflect reference beams 1409 and 1410, which are a small percentage of beams 1402 and 1404, onto means 1411 and 1412 which sense the energy of beams 1409 and 1410 and generate reference beam voltage signals $I_{R1}$ and $I_{R2}$ which are reflective of the magnitude of the sensed energy and are relatively constant and similar to the reference signal of the second embodiment illustrated in FIG. 9. In the embodiment of FIG. 14, reference beams 1409 and 1410 can be reflected at an angle of 8° from the perpendicular so as to reduce their polarization and help compensate for the above described polarization effect. In the embodiment of FIG. 14, means 1411 and 1412 comprise silicon photovoltaic power meter sensors Model 401B manufactured by Spectra-Physics, Inc. Other means to sense the energy of the beams and generate a voltage signal reflective of the magnitude of the sensed energy are fully within the scope of this invention. As in the case of the second embodiment, reference beam signals $I_{R1}$ and $I_{R2}$ provide continuous monitoring of the power output of the light beams.

Continuing with the third embodiment of the invention illustrated in FIG. 14, beams 1407 and 1408 having a selected angular separation in the horizontal plane, for example 25°, and are then reflected from two prisms 1413 and 1414 to form coplaner beams 1415 and 1416 which, although in a different plane, are also separated by the same angular separation as were beams 1407 and 1408. In a manner which is similar to the second embodiment, beams 1415 and 1416 reside in a vertical plane substantially perpendicular to the face of spinneret 1417 and are positioned at a distance from spinneret 1417 so that beams 1415 and 1416 cross at a capillary as illustrated in FIG. 14. Beam 1415 is parallel to the axis of the capillary and can be thought of as an axial beam, such as beam 801 as illustrated in FIG. 8. Beam 1416 is rotated from the paralleled position to the selected angle and can be thought of as an angular beam, such as beam 802 as illustrated in FIG. 8. The energy of the portion 1418 of axial beam 1415 that passes through the capillary is the value $I_o$ and the energy of the portion 1419 of angular beam 1416 that passes through the capillary is the value $I_\theta$.

Prisms 1413 and 1414 are mounted on cylindrical shaft 1420 for oscillatory movement about the axis of the shaft by suitable conventional means such as described with regard to the second embodiment.

Oscillation of shaft 1420 causes beam 1415 and 1416 to sweep in the radial direction across the spinneret face as in the same manner as in the second embodiment.

Spinneret 1417 is rotationally mounted in a suitable conventional means as in the second embodiment and the slow rate of rotation of spinneret 1417 compared to the rate of radial oscillation of beams 1415 and 1416 provides a plurality of sweeps through each capillary as the spinneret rotates. The rate of rotation of spinneret 1417 and the rate of oscillation of the beam 1415 and 1416 can be the same as in the second embodiment.

Still referring to the embodiment of FIG. 14, below spinneret 1417, and in line with the approximate beam axes of axial beam 1415 and angular beam 1416, are placed means 1421 and 1422 which sense the energy of beams 1418 and 1419 passing through the capillary and generate voltage signals $I_o$ and $I_\theta$ which are reflective of the magnitude of the sensed energy and are similar to the $I_o$ and $I_\theta$ signals of the second embodiment illustrated in FIG. 9. In the embodiment of the inveniton illustrated in FIG. 14, means 1421 and 1422 can comprise silicon photovoltaic power meter sensors, Model 401B manufactured by Spectra-Physics, Inc. Other means to sense the energy of the beams and generate a voltage signal reflective of the magnitude of the sensed energy can be used within the scope of this invention.

As in the case of the second embodiment, because beams 1415 and 1416 are radially oscillating along radii of the circle defined by the center of the orifices of spinneret 1417, and further because spinneret 1417 is rotating, the quantity of beams 1415 and 1416 that pass through spinneret 1417 is oscillatory in character with the amplitude of the oscillation increasing as the spinneret rotates so as to convey a capillary into the sweep of the beams. The oscillations reach a maximum when the center of beams 1415 and 1416 are coincident with the center of a capillary, and the oscillation subsequently decreases to zero when the capillary rotates past the sweep of the beams and none of the light from beams 1415 and 1416 pass through the capillary. Accordingly, the graphical representation of the output voltages $I_o$, $I_\theta$, $I_{R1}$ and $I_{R2}$ are analogous to those illustrated in FIG. 9, except that in the third embodiment of the invention two reference signals are employed. The voltage outputs $I_o$, $I_\theta$, $I_{R1}$ and $I_{R2}$ are then introduced into the functionally described circuitry illustrated in FIG. 15.

Figure 15:
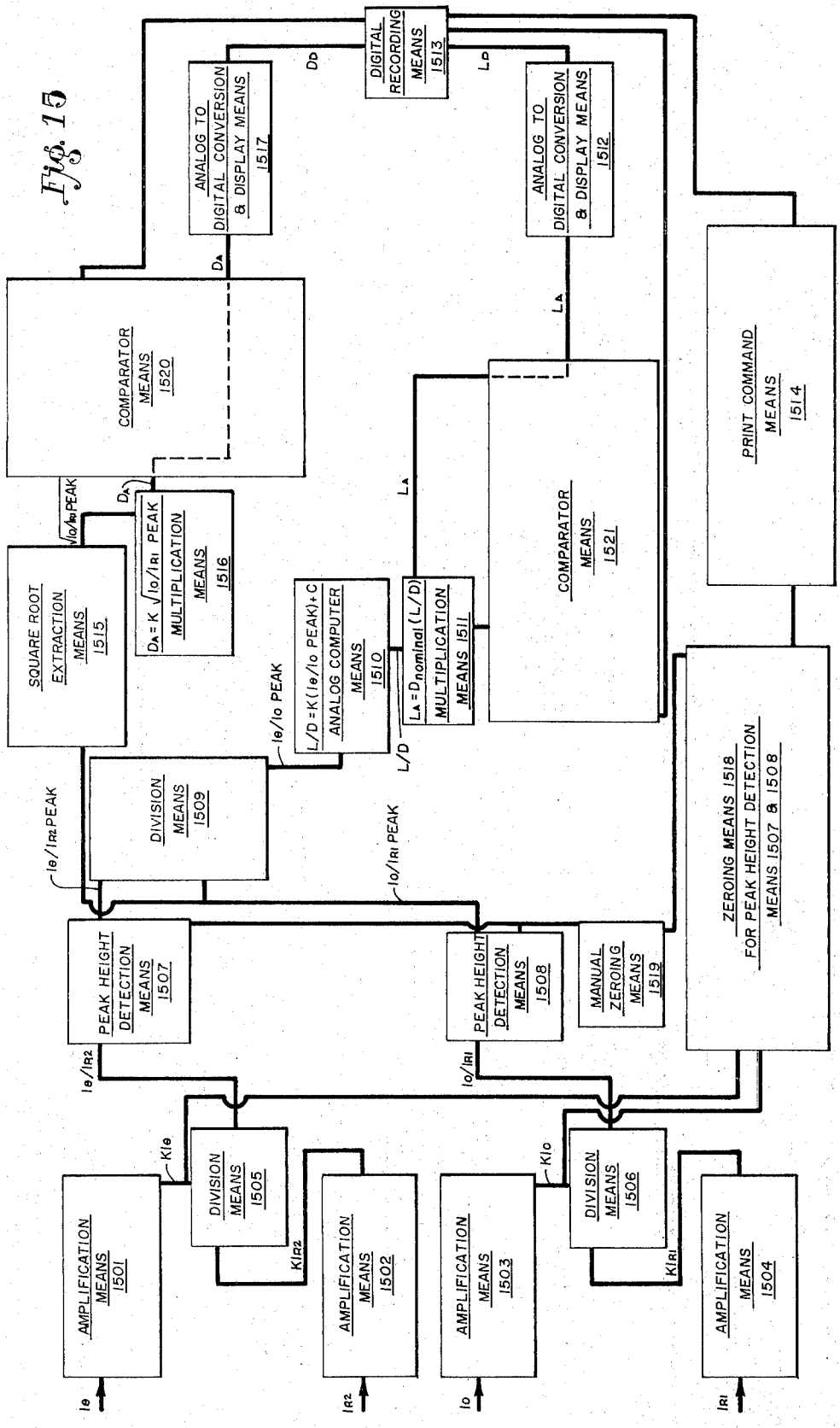
FIG. 15 is a schematic functional representation of the electronic circuitry of the third embodiment that determines the capillary length and diameter by solving the equation of FIG. 4 using as the input the voltage signals $I_o$, $I_\theta$, $I_{R1}$ and $I_{R2}$ which are the outputs of the third embodiment of the invention of FIG. 14.

In FIG. 15 voltage outputs $I_o$, $I_\theta$, $I_{R1}$ and $I_{R2}$ are introduced into amplification means 1501, 1502, 1503 and 1504 to bring the voltage levels to a workable amplitude $KI_o$, $KI_\theta$, $KI_{R1}$ and $KI_{R2}$. These signals are then fed through division means 1505 and 1506 which ratio the angular signal with one reference signal and the axial signal with the other reference signal to give signals $I_o/I_{R1}$ and $I_\theta/I_{R2}$, which are similar to the $I_o/I_R$ and $I_\theta/I_R$ signals of the second embodiment shown in FIG. 11. The signals $I_o$ and $I_\theta$ are divided by $I_{R1}$ and $I_{R2}$ so as to compensate for the previously noted long and short term variations in the power of light beams 1402 and 1404, which cause the signals $I_o$, $I_\theta$, $I_{R1}$ and $I_{R2}$ to be ragged in the same manner as in the second embodiment illustrated in FIG. 9. Thus, the wave forms for the signls $I_o/I_{R1}$ and $I_\theta/I_{R2}$ are very smooth and are similar to the wave forms illustrated in FIG. 11.

Referring back to FIG. 15, signals $I_o/I_{R1}$ and $I_\theta/I_{R2}$ are then introduced into peak height detection means 1507 and 1508. These detection means detect and store the highest amplitude of each signal in a manner analogous to the second embodiment and produce signals $I_o/I_{R1}$ Peak and $I_\theta/I_{R2}$ Peak. The peak height signals $I_o/I_{R1}$ Peak and $I_\theta/I_{R2}$ Peak are then introduced into division means 1509 which divides the signal $I_\theta/I_{R2}$ Peak by the signal $I_o/I_{R1}$ Peak and yields the ratio $I_\theta/I_o$ Peak.

In a manner analogous to the second embodiment, the signal $I_\theta/I_o$ Peak is introduced into analogue computer means 1510 which analogizes a $y = ax + b$ or $L/D = K(I_\theta/I_o) + C$ or $L/D = -1.898(I_\theta/I_o) + 1.716$ linear approximation of the curve in FIG. 5 for the selected angle and analogue computer means 1510 solves for the value of L/D. The value L/D is then introduced into multiplier means 1511 and the value L/D is multiplied by the nominal diameter of the capillary, $D_{nominal}$, to provide an anlogue signal, $L_A$, reflective of the length of the capillary. The analogue signal $L_A$ is then introduced into analog to digital conversion and display means 1512 wherein the analog signal $L_A$ is converted to a digital signal, $L_D$. The digital signal $L_D$ is visually displayed and conducted to digital recording means 1513 wherein the digital signal $L_D$ is recorded.

Describing now the determination of the value D, which is similar to the determination of the value D in the second embodiment of the invention, reference is again made to FIG. 15 wherein the signal $I_o/I_{R1}$ Peak from peak height detection means 1508 is introduced into square root extraction means 1515 which extracts the square root of $I_o/I_R$ Peak. The signal $\sqrt{I_o/I_{R1}\text{ Peak}}$ is then introduced into multiplication means 1516 and multiplied by an appropriate value of K to provide an analog signal, $D_A$, reflective of the capillary diameter D. The analog signal $D_A$ is then introduced into analog to digital conversion means 1517 wherein the analog signal $D_A$ is converted to a digital signal, $D_D$. The digital signal $D_D$ is visually displayed in means 1517 and conducted to digital recording means 1513 wherein the digital DD is recorded. Thus, digital recording means 1513 has recorded both the determined diameter and length of each spinneret. A typical printout of these data is illustrated in FIG. 17.

As in the case of the second embodiment, a zeroing function can be applied to peak height detection means 1507 and 1508 since these means sense and retain the highest amplitude of the oscillating voltages applied and the retained voltage $I_0/I_{R1}$ Peak and $I_\theta/I_{R2}$ Peak must be reduced to zero voltage before the next succeeding capillary can be measured. In order to accomplish this zeroing function the apparatus of FIG. 15 can incorporate zeroing means 1518 for peak height detection means 1507 and 1508. Zeroing means 1518 functions by sensing the absence of a signal $KI_\theta$ and $KI_0$ from amplification means 1501 and 1503 when spinneret 1417 rotates so as to entirely remove the recently measured capillary from the sweep of beams 1415 and 1416. Responsive to the absence of these signals, zeroing means 1518 generates a zeroing signal which is conducted to peak height detection means 1507 and 1508 thereby causing the voltage $I_\theta/I_{R2}$ Peak and $I_0/I_{R1}$ Peak to decay to zero. Peak height detection means 1507 and 1508 are then ready to sense and retain the amplitude of the oscillating increasing voltages $I_0/I_{R1}$ and $I_\theta/I_{R2}$ when the rotation of spinneret 1417 positions the next succeeding capillary to be measured within the sweep of beam 1415 and 1416.

Zeroing means 1518 provides an automatic zeroing function but optionally manual zeroing means 1519 can be utilized to perform the zeroing function upon manual actuation.

To eliminate the need for manual activation of the recorder each time the $D_D$ and $L_D$ are conducted to the printer, a print command means 1514 can be employed to trigger a print cycle after the passage of a capillary through the sweeping beams.

In another aspect (not shown) of this embodiment of the invention, the signal $D_A$ generated by multiplication means 1516 can be conducted to multiplication means 1511 and the value $L_A$ can then be determined by multiplying L/D by $D_A$ instead of $D_{nominal}$. Although the use of the $D_A$ value instead of $D_{nominal}$ value gives greater accuracy, the use of the $D_{nominal}$ value gives results which are entirely satisfactory for many applications.

During measurement of the capillaries of a spinneret using the third embodiment of the invention an operator observes the visual and recorded display of capillary length and diameter data. After mentally applying a certain tolerance, the operator determine both the individual capillaries having diameters or lengths out of tolerance, as well as the total number of capillaries having daimeters or lengths out of tolerance, and thereby the operator can identify a defective spinneret. If the diameter and length data is being generated fairly slowly a skilled operator can identify defective spinnerets by observing the presented diameter and length data, mentally applying tolerances and determining the total number of diameters and lengths out of tolerance. However, if it is desired to measure the capillaries of a spinneret rapidly the large volume of length and diameter data presented to the operator in a short time exceeds his ability to perform the mental steps required to identify a defective spinneret. For instance, if 30 capillaries are measured in one minute this generates 60 data outputs representing the length and diameter of each capillary. Even a highly skilled operator could not typically perform the mental steps required to identify and total the number of out-of-tolerance data points.

For rapid measurement analog comparators 1520 and 1521 can be used. When fed the appropriate nominal voltage values and tolerance limits for the diameter and length of the capillaries, the comparators electrically compare the analogue values with maximum and minimum values and provide a "go/no-go" output to indicate whether each determined length or diameter is within tolerance. The comparator outputs can be interfaced to digital recording means 1513 in such a manner that a signal character, such as the letter $n$, appears in the printed column to th immediate left of any out-of-tolerance measurement as illustrated in FIG. 17. In the embodiment of FIG. 15 comparators 1520 and 1521 can comprise a Model 4021/25 comparator manufactured by the Burr-Brown Corporation. Although this technique for identification of out-of-tolerance diameters and lengths considerably simplifies the problem of the operator having to mentally apply a tolerance to identify defective spinnerets, if it is desired to rapidly average the data, compute statistical parameters, or automatically calibrate the apparatus, a digital computer, such as the PDP–8/E-BA minicomputer manufactured by the Digital Equipment Corporation, can be used.

Figure 16:
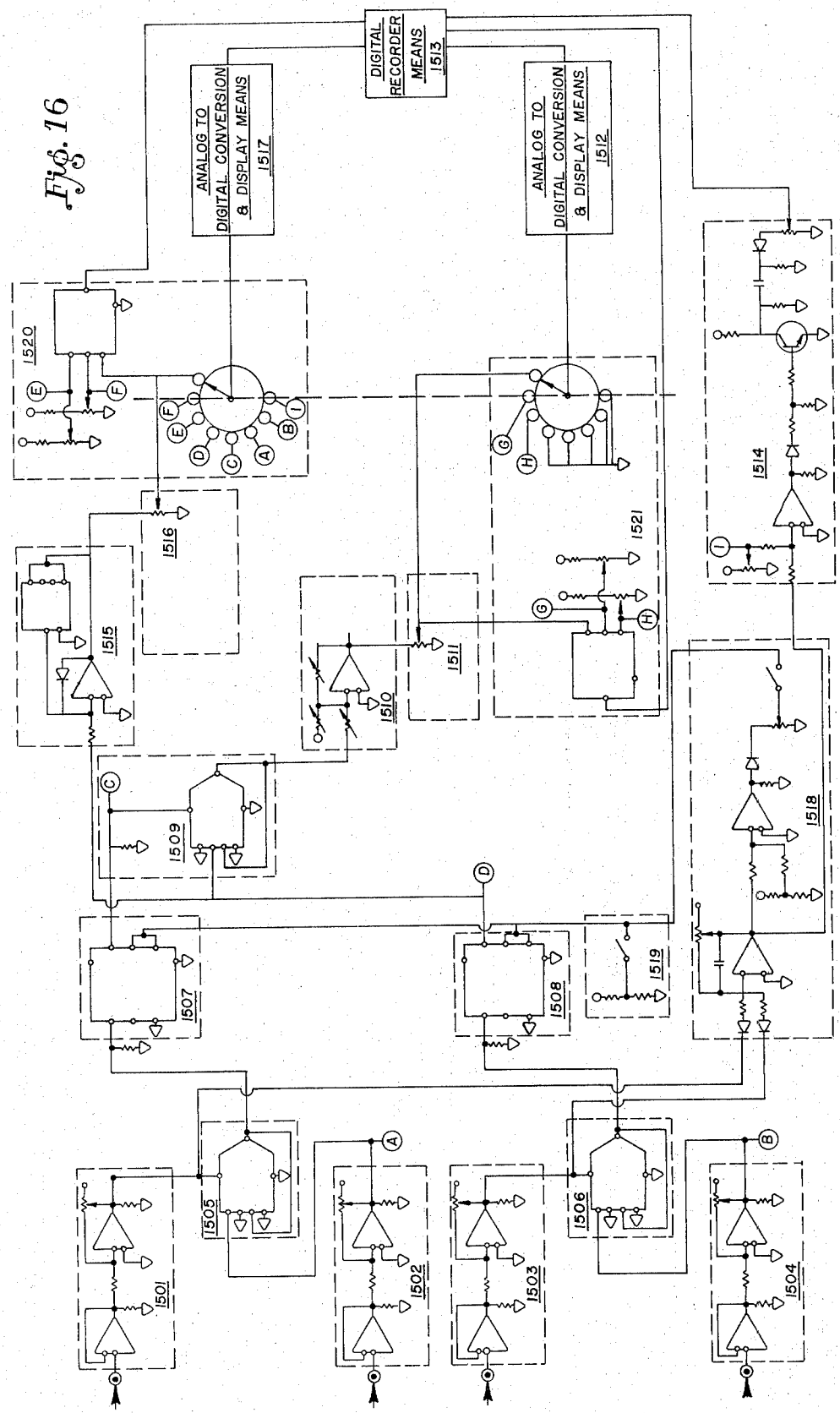
FIG. 16 is one specific embodiment of the circuitry described functionally in FIG. 15

Referring now to FIG. 16 there is illustrated one specific embodiment of the functional circuitry shown in FIG. 15. It will be recognized that other specific embodiments of the functional circuitry of FIG. 15 can be used within the scope of this invention.

In FIG. 16 one embodiment of amplification means 1501, 1502, 1503 and 1504 comprise serially operated Model 3129/15 amplifiers manufactured by the Burr-Brown Corporation. Other circuitry well known in the art can be used to provide the amplification function of amplification means 1501, 1502, 1503 and 1504.

The output signals from amplification means 1501, 1502, 1503 and 1504 are conducted to division means 1505 and 1506 which in the specific embodiment of FIG. 16 comprise a Model 4098/25 divider manufactured by Burr-Brown Corporation. Other division circuitry well known in the art can be used in place of the above described division means.

The signals $I_0/I_{R1}$, $I_\theta/I_{R2}$ coming from division means 1505 and 1506 are conducted through peak height detection means 1507 and 1508. In the embodiment of FIG. 16 peak height detection means 1507 and 1508 comprise a Model 4084/25 peak height detecting module manufactured by the Burr-Brown Corporation.

The output signals from peak height detection means 1507 and 1508 are then conducted to division means 1509 which in the embodiment of FIG. 16 comprises a Model 4096/15 divider manufactured by the Burr-Brown Corporation. Other conventional dividing circuitry could be used within the scope of this invention.

The output signal $I_\theta/I_0$ Peak from division means 1509 is then conducted to analog computer means 1510. In the specific embodiment of FIG. 16 analog computer means 1510 comprises a Model 3020/15 amplifier manufactured by the Burr-Brown Corporation which multiplies the signal $I_\theta/I_0$ Peak by the value K and the value C is then added through a variable resistor to form the value $K(I_\theta/I_0 \text{ Peak}) + C$ which is the value L/D.

The value of L/D is then conducted to multiplication means 1511 and in the specific embodiment of FIG. 16 a variable resistor is used to produce the signal $L_A$ by multiplying the signal by the value $D_{nominal}$. If it is desired to multiply the L/D value by $D_A$ then suitable conventional circuitry can be used in place of the variable resistor. Other circuitry well known in the art could be used in multiplication means 1511.

The signal $L_A$ generated by multiplication means 1511 is then conducted to analog to digital conversion and display means 1512 which in the embodiment of FIG. 16 comprises a Datascan Model 520–V3 digital panel meter manufactured by Datascan Corporation. In this embodiment of means 1512 the analog signal $L_A$ is converted to a digital signal and the digital signal is displayed for visual observation.

The digital signal is then conducted to digital recorder means 1513 which in the specific embodiment of FIG. 16 comprises a Hewlett-Packard Model 5055A Digital Recorder. This instrument is particularly suitable since it has a ten column capacity, ten lines per second writing speed, and generates an internal "inhibit" signal to maintain a constant value from the data source during the print cycle.

In the specific embodiment of FIG. 16 print command means 1514 can comprise an arrangement including a Model 3020/15 amplifier manufactured by the Burr-Brown corporation having one input attached to the sliding integrator of zeroing means 1518. By establishing an appropriate bias level on the comparator operating in conjunction with the analog to digital conversion and display means the print cycle was activated just prior to the zeroing of the peak height detectors, thus assuring that only relevant data would be printed.

In the embodiment of the invention of FIG. 16 zeroing means 1518 comprises diodes operating in conjunction with a Model 3020/15 amplifier manufactured by the Burr-Brown Corporation which is operating with an arrangement of a capicator and variable resistor across the amplifier. The output from this amplifier is attached to the input to a Model 3020/15 amplifier manufactured by the Burr-Brown Corporation. The output from this amplifier is attached to a diode and variable resistor which are attached through a suitable switch to the zeroing input of peak height detection means 1507 and 1508. Other conventional circuitry could be used as the zeroing means.

Still referring to FIG. 16 manual zeroing means 1519 comprises in this embodiment a switch upon which a constant voltage is impressed. Other circuitry well known in the art could be used as zeroing means 1519.

In the specific embodiment of FIG. 16 comparator means 1520 and 1521 can comprise a Model 4021/25 window comparator manufactured by the Burr-Brown Corporation.

Still referring to FIG. 16, the signal $I_0/I_{R1}$ Peak generated by peak height detection means 1508 is conducted to square root extraction means 1515 which in the embodiment of FIG. 16 comprises the combination of a Model 3020/15 amplifier manufactured by the Burr-Brown Corporation operating in conjunction with a Model 9874/19 Squaring Module manufactured by the Burr-Brown Corporation. Other conventional square root extracting circuitry could be used if desired.

The signal $\sqrt{I_0/I_{R1}}$ Peak generated by square root extraction means 1515 is then conducted to multiplication means 1516 wherein the value $D_A$, which is the analogue value reflective of the diameter of the capillary, is computed by a variable resistor which multiplies an appropriate vlaue of K by the value $\sqrt{I_0/I_{R1}}$ Peak. Other multiplication circuitry of conventional design can be used if desired.

The signal $D_A$ which is the analogue expression of the diameter of the capillary is then conducted to analogue to digital conversion and display means 1517, which in the embodiment of FIG. 16 is identical to means 1512. As in the case of means 1512, means 1517 is interfaced to digital recorder means 1513.

In developing the equation of FIG. 4 it was assumed that a perfectly uniform power distribution exists across the light beam, that the capillary is an ideal right circular cylinder, that the capillary walls have an absorptance coefficient of 1.0, and that no diffraction effects exist. If desired, these factors can be incorporated into the equation of FIG. 4 and the straight line approximation of the curve for any selected angle will be altered accordingly. In another approach, the equation developed using the above described assumptions, which is $$L/D = -1.90(I_{25}/I_0) + 1.72$$

can be emperically altered on the basis of correlation of length and diameter data generated by the invention with length and diameter data obtained from use of the scanning electron microscope to the form $$L/D = -2.53(I_{25}/I_0) + 2.30.$$

Although results which are accurate for many applications can be obtained using this invention to measure either newly manufactured spinnerets or used reconditioned spinnerets, greater accuracy can be obtained when measuring used reconditioned spinnerets by considering a correction for the "bulge" of the face of the spinneret created by typical pressure conditions during spinning.

Newly manufactured spinnerets typically have a flat or substantially planar face and the capillaries are located so that the axis of the capillary is parallel to the axis of the spinneret. Referring to FIG. 18 there is illustrated a cross-sectional view in elevation of a newly manufactured spinneret 1801 having a flat face 1802 and a series of capillaries 1803 having their axes parallel to the axis of spinneret 1801. Thus, since the axis of capillary 1803 is parallel to the axis of spinneret 1802 a light beam parallel to the axis of spinneret 1801 will also be parallel to the axis of capillary 1803 in the same manner as is illustrated in FIG. 2.

Due to the extremely high pressure of the molten or dissolved polymer being extruded into filaments through the orifices of the spinneret, operation of a spinneret typically causes the spinneret to "bulge" and forms the upstream face of the spinneret into a concave configuration which is a portion of the surface of a sphere. Referring now to FIG. 19 there is illustrated used reconditioned spinneret 1901 having concave face 1902 (slightly exaggerated) and a series of capillaries 1903 having their axes tilted at angle $\phi$ with respect to the axis of spinneret 1901. Thus, the axis of capillary 1903 is slightly disposed at angle $\phi$ with respect to the axis of spinneret 1901 and a light beam parallel to the axis of spinneret 1901 will be at an angle $\phi$ with respect to the axis of capillary 1901 much in the same manner as is illustrated in FIG. 3 with regard to angle $\theta$. Thus, the angle between the beam and the axis of the hole is substantially the same angle as the angle between a perpendicular to the beam and a tangent to a great circle of the sphere.

Since in certain cases it is often desirable to increase the accuracy of the results obtained when measuring used reconditioned spinnerets, a compensation can be made for the axis of the capillary already being tilted slightly due to the bulge of the spinneret as illustrated in FIG. 15.

As noted earlier, the equation of FIG. 4 correlates the values $I_\theta$, $I_0$, L, D, and $\theta$ is based on the use of an $I_0$ value obtained when the axis of the capillary is disposed parallel to the axis of the light beam illustrated in FIG. 2 and FIG. 18. When the invention is used to measure the capillaries of used reconditioned spinnerets having a bulged face as illustrated in FIG. 19 the value $I_0$ cannot be obtained by directing upon capillary 1903 a light beam parallel to the axis of spinneret 1901. If a parallel beam were to be directed through capillary 1903 then the value would not be $I_0$ but would be a value $I_\phi$.

Accordingly, if one desires to compensate for the bulge the equation of FIG. 4 is no longer valid and a new equation must be developed.

A suitable equation can be developed by measuring the energy of the light beam passing through the spinneret from two off-axis locations. Accordingly, a value $I_\phi$ is measured from a light beam that is parallel to the axis of the spinneret and is therefore off-axis by exactly the bulge angle $\phi$. The second value $I_{\phi,\theta}$ is measured at an angle of inclination to the capillary axis which is a function both of the bulge angle $\phi$ and the original angle of observation $\theta$. This new angle of observation will be designated by $\wp$. If this angle $\wp$ were known as a function of the measurable angles $\theta$ and $\phi$, the problem would be simplified since then $I_{\phi,\theta}/I_0$ could be obtained by simply substituting $\wp$ for $\theta$ in the equation of FIG. 4. The relationship between these angles is illustrated in FIG. 20. The $Z''$ axis is the axial direction in the spinneret capillary, the Z axis is the direction of observation of $I_\phi$, and the $Z'$ axis is the direction of observation of $I_{\phi,\theta}$. The Y axis is tangent to the circle defined by the center of the orifices of the spinneret and the X axis points toward the center of the spinneret. $\hat{i}, \hat{j}$, and $\hat{k}$ are unit vectors along the X, Y, and Z axes respectively, as are $\hat{Z}'$ and $\hat{Z}''$ in their respective directions. $\wp$ is the included angle between $\hat{Z}'$ and $\hat{Z}''$.

From FIG. 20 it can be seen that the vectors $\hat{Z}'$ and $\hat{Z}''$ are given by:

$$\hat{Z}' = \sin\theta\,\hat{j} + \cos\theta\,\hat{k}, \text{ and}$$
$$\hat{Z}'' = \sin\phi\,\hat{i} + \cos\phi\,\hat{k}.$$

Then the new observation angle $\wp$ can be obtained by forming the scalar product of $\hat{Z}'$ with $\hat{Z}''$:

$$\hat{Z}' \cdot \hat{Z}'' = |\hat{Z}'||\hat{Z}''|\cos\wp$$

This yields, $$\cos\theta\cos\phi = \cos\wp;$$

or, $$\wp = \cos^{-1}(\cos\theta\cos\phi).$$

Then, as previously indicated, $I_{\phi,\theta}/I_0$ is obtained immediately by replacing $\theta$ with $\wp$ in the Equation of FIG. 4.

Again, however, $I_{\phi,\theta}/I_0$ is not a measurable quantity. What will be measured is the parameter $I_{\phi,\theta}/I_\phi$, and the equation of FIG. 4 then becomes the equation of FIG. 21.

Thus, the intensity ratio is described in terms of the length-to-diameter ratio since $\wp$ as a function of $\theta$ and $\phi$ is known through the above equation. The equation of FIG. 21 can be solved by iteration for values of $\theta$ equal 20° and 25°. For each value of $\theta$, $\phi$ has been allowed to range from 0° to 10° in 2° increments. As an example of the resulting curves, the equation of FIG. 17 has been plotted in FIG. 22 for $\theta = 25°$ and $\phi = 0°$, 4°, and 10°. As will be recalled, the region of considerable interest is $$0 < K/D < 0.5.$$

Choosing, for example, a value for L/D of 0.20 it can be seen that a 10° bulge would cause an error of approximately 2.6 microns in the length of a 50 micron diameter capillary. This is a relatively large bulge angle, but in some large spinnerets, bulge angles greater than 5° are not uncommon.

In spinnerets of about 3 inches diameter or more the use of the bulge correction is particularly desirable.

This invention is adapted to measure spinnerets used for form a wide variety of polymers into fibers by numerous spinning techniques. As examples, spinnerets used to melt spin polyesters, polyamides and polycarbonates can be measured with this invention. Also spinnerets used to solution spin acrylonitrile polymers and cellulose acetate can be measured using this invention. Spinnerets used in dry spinning can be measured using this invention.

This invention is also adapted to measure the length and diamerer of substantially any size of hole in substantially any size substrate and should not be considered to be limited to measuring small holes, although the invention is especially adapted for measuring holes that are too small to be measured using conventional linear measuring devices. Of course, the invention is not to be limited to measuring spinneret orifices as it is much broader in scope. The invention should also not be limited to measuring holes in thin substrates.

One particular advantage of this invention is the rapidity with which the length and diameters of orifices can be measured. When the third embodiment of the invention is used to measure spinneret capillaries, hundreds of 13 orifice spinnerets can be measured in one day. In fact, using the third embodiment of the invention, approximately 10,000 capillaries can be measured in a single day as compared to 100 capillaries per day using the previously described molding process, 200 capillaries per day using the previously described scanning electron microscope method or 300 capillaries per day using the light microscope method.

The invention has been described in detail with particular reference to several preferred embodiments thereof, but it will be understood that a wide variety of variations and modifications can be effected within the spirit and scope of the invention.

We claim:

1. A method of measuring the length of a hole in a substrate comprising
   1. positioning within a measurement zone a substrate having a hole therein,
   2. generating a first and a second electromagnetic beam,
   3. positioning the first electromagnetic beam at a first angle with regard to the axis of the hole and upon the hole in such a manner that at least a portion of the beam passes through the hole, 4. positioning the second electromagnetic beam at a second angle with regard to the axis of the hole and upon the hole in such a manner that at least a portion of the beam passes through the hole, 5. sensing the quantity of energy in the portion of the first electromagnetic beam passed through the hole and generating a first signal reflective of the magnitude of the sensed quantity of energy, 6. sensing quantity of energy in the portion of the second electromagnetic beam passed through the hole and generating a second signal reflective of the magnitude of the sensed quantity of energy, 7. determining the ratio of the first and second signals and generating a third signal reflective of the magnitude of the ratio of the first and second signals, 8. determining the relationship between the first angle and second angle, 9. mathematically correlating the ratio of the length and diameter of the hole in terms of the magnitude of the ratio of the first and second signals and the relationship between the first angle and second angle, 10. determining the ratio of the length and diameter of the hole by solving the mathematical correlation and generating a fourth signal reflective of the amgnitude of the ratio of the length and diameter, 11. determining the length of the hole by multiplying the fourth signal by a value reflective of a nominal diameter for the hole.

2. The method of claim 1 wherein
the first and second electromagnetic beams are visible light beams,
the hole has a symmetrical cross-section about an axis perpendicular to the axis of the hole,
the substrate is of substantially uniform thickness,
the first and second visible light beams have a substantially uniform energy distribution across the beams and are composed of substantially parallel rays.
the first and second visible light beams have a cross-sectional area larger than the hole, and
the first and second visible light beams are positioned so that the light beams entirely cover the hole.

3. The method of claim 2 wherein
the first and second visible light beams are laser beams,
the diameter of the hole is less than 1,000 microns, and
the thickness of the substrate is less than 5 millimeters.

4. The method of claim 3 wherein
the hole is an orifice in a spinneret,
the substrate is the face of a spinneret, and
at least a portion of the orifice defines a right circular cylinder passageway which is a capillary of the orifice.

5. The method of claim 4 wherein
the face of the spinneret is substantially planar, and
the first angle is substantially zero.

6. The method of claim 4 wherein
the shape of the face of the spinneret is a portion of the surface of a sphere, and
the first angle is substantially the same angle as the angle between a perpendicular to the first laser beam and a tangent to a great circle of the sphere.

7. The method of claim 4 wherein
the first and second laser beams are optically positioned upon the capillary of the orifice in the spinneret,
the quantity of energy in the portion of the first laser beam passed through the capillary is sensed and the first signal is generated by photoelectrically converting the light energy of the portion of the beam into the first signal which is an electrical signal having a voltage reflective of the magnitude of the sensed quantity of energy,
the quantity of energy in the portion of the second laser beam passed through the capillary is sensed and the second signal generated by photoelectrically converting the light energy of the portion of the beam into the second signal which is an electrical signal having a voltage reflective of the magnitude of the sensed quantity of energy,
the ratio of the first and second signals are determined and the third signal generated by electrically dividing the voltage of either the first or second electrical signal by the voltage of the other electrical signal and generating the third signal which is an electrical signal having a voltage reflective of the magnitude of the divided voltages of the first and second signals, and
the ratio of the length and diameter of the capillary is determined by electrically solving the mathematical correlation and the fourth signal generated is an electrical signal having a voltage reflective of the magnitude of the ratio of the length and diameter of the capillary, and
the length of the capillary is determined by electrically multiplying the voltage of the fourth electrical signal by a value reflective of a nominal diameter for the capillary,
the method further includes electrically generating a fifth electrical signal having a voltage reflective of the magnitude of the length of the capillary,
the method further includes electrically generating a sixth visually displayable signal which is the length of the capillary, and
the method further includes visually displaying the sixth signal which is the length of the capillary.

8. The method of claim 7 further including
electrically comparing the voltage of the fifth signal with maximum and minimum voltages reflective of maximum and minimum permissible values for the length of the capillary,
electrically generating a visually displayable reject signal when the voltage of the fifth signal is either lower than the minimum voltage or higher than the maximum voltage, and
visually displaying the reject signal in correlation with the visual display of the sixth signal which is the length of the capillary.

9. A method of measuring the length of a capillary of an orifice in a spinneret comprising
1. rotating about its axis a spinneret having a plurality of orifices disposed in a circle substantially concentric to the axis of the spinneret, at least a portion of each orifice defining a right circular cylinder capillary passageway, 2. generating a first and a second laser beam, each beam having a size larger than the size of the capillary,
3. optically dividing the first laser beam into a first reference laser beam and a first measurement laser beam,
4. optically dividing the second laser beam into a second reference laser beam and a second measurement laser beam,
5. optically positioning the first measurement laser beam substantially parallel to the axis of the spinneret and upon an orifice in such a manner that the beam entirely covers the orifice and a portion of the beam passes through the capillary of the orifice,
6. optically positioning the second measurement laser beam at a predetermined angle with regard to the axis of the spinneret and upon the orifice in such a manner that the beam entirely covers the orifice and a portion of the beam passes through the capillary of the orifice,
7. optically radially oscillating the first and second measurement laser beams across the circle defined by the centers of the plurality of orifices, the radial oscillation being at a suitable rate to allow the portion of the first and second beams to substantially simultaneously pass through the capillary of the orifice on at least three consecutive oscillations,
8. sensing the quantity and the nonuniform character of energy in the portion of the first measurement laser beam passed through the capillary of the orifice by photoelectrically converting the light energy of the portion of the beam into a first measurement electrical signal having a oscillatory voltage reflective of the magnitude and nonuniform character of the sensed energy,
9. sensing the quantity and the nonuniform character of energy in the portion of the second measurement laser beam passed through the capillary of the orifice by photoelectrically converting the light energy of the portion of the beam into a second measurement electrical signal having an oscillatory voltage reflective of the magnitude and nonuniform character of the sensed energy,
10. sensing the nonuniform character of the energy in the first reference laser beam and generating a first reference electrical signal having a voltage reflective of the nonuniform character of the sensed energy,
11. sensing the nonuniform character of the energy in the portion of the second reference laser beam and generating a second reference electrical signal having a voltage reflective of the nonuniform character of the sensed energy,
12. electrically dividing the voltage of the first measurement electrical signal by the voltage of the first reference electrical signal, and generating a third electrical signal having an oscillatory uniform voltage reflective of the magnitude of the division,
13. electrically dividing the voltage of the second measurement electrical signal by the voltage of the second reference electrical signal and generating a fourth electrical signal having an oscillatory uniform voltage reflective of the magnitude of the division,
14. sensing the maximum amplitude of the oscillating voltage of the third electrical signal and generating a fifth electrical signal having a voltage which is substantially constant and equal to the amplitude of the maximum voltage oscillation of the third signal,
15. sensing the maximum amplitude of the oscillating voltage of the fourth electrical signal and generating a sixth electrical signal having a voltage which is substantially constant and equal to the amplitude of the maximum voltage oscillation of the fourth signal,
16. electrically determining the ratio of the sixth electrical signal to the fifth electrical signal by dividing the voltage of the sixth signal by the voltage of the fifth signal and generating a seventh electrical signal having a voltage reflective of the magnitude of the ratio,
17. mathematically correlating the ratio of the length of the capillary to the diameter of the capillary in terms of a linear approximation of the ratio of the sixth electrical signal to the fifth electrical signal and the predetermined angle of the second measurement laser beam with regard to the axis of the spnnneret,
18. electrically determining the ratio of the length of the capillary to the diameter of the capillary by adding a predetermined voltage to the product of the multiplication of the voltage of the seventh electrical signal by a predetermined value and generating an eighth electrical signal having a voltage reflective of the magnitude of the ratio of the length of the capillary to the diameter of the capillary,
19. electrically determining the length of the capillary by multiplying the voltage of the eighth electrical signal by a value reflective of the nominal diameter of the capillary and generating a ninth electrical signal reflective of the magnitude of the length of the capillary,
20. electrically generating a tenth visually displayable signal which is the value of the length of the capillary,
21. visually displaying the tenth signal which is the value of the length of the capillary,
22. electrically comparing the voltage of the ninth electrical signal with maximum and minimum voltages reflective of maximum and minimum permissible values for the length of the capillary,
23. electrically generating a visually displayable reject signal when the voltage of the ninth signal is either less than the maximum voltage or more than the maximum voltage, and
24. visually displaying the reject signal in correlation with the visual display of the tenth signal which is the value of the length of the capillary.

10. The method of claim 9 wherein
the spinneret is rotated at a rate within the range of 0.1 to 10 revolutions per minute, and
the first and second measurement laser beams are oscillated at a rate in the range of 10 to 1,000 hertz.

11. A method of measuring both the length and diameter of a hole in a substrate comprising
1. positioning within a measurement zone a substrate having a hole therein,
2. generating a first and a second electromagnetic beam, 3. positioning the first electromagnetic beam at a first angle with regard to the axis of the hole and upon the hole in such a manner that at least a portion of the beam passes through the hole,
4. positioning the second electromagnetic beam at a second angle with regard to the axis of the hole and upon the hole in such a manner that at least a portion of the beam passes through the hole,
5. sensing the quantity of energy in the portion of the first electromagnetic beam passed through the hole and generating a first signal reflective of the magnitude of the sensed quantity of energy,
6. developing a first mathematical correlation for the diameter of the hole in terms of a predetermined constant multiplied by the square root of the sensed quantity of energy in the portion of the first electro-magnetic beam passed through the hole,
7. determining the diameter of the hole by solving the first mathematical correlation and generating a second signal reflective of the magnitude of the diameter of the hole,
8. sensing the quantity of energy in the portion of the second electromagnetic beam passed through the hole and generating a third signal reflective of the magnitude of the sensed quantity of energy,
9. determining the ratio of the first and third signals and generating a fourth signal reflective of the magnitude of the ratio of the first and third signals,
10. determining the relationship between the first angle and second angle,
11. developing a second mathematical correlation for the ratio of the length and diameter of the hole in terms of the magnitude of the ratio of the first and third signals and the relationship between the first angle and second angle,
12. determining the ratio of the length and diameter of the hole by solving the mathematical correlation and generating a fifth signal reflective of the magnitude of the ratio of the length and diameter, and
13. determining the length of the hole by multiplying the fifth signal of a value selected from the group consisting of a value reflective of a nominal diameter for the hole and the value of the second signal which is the diameter of the hole determined by solving the first mathematical correlation.

12. The method of claim 11 wherein
the first and second electromagnetic beams are visible light beams,
the hole has a symmetrical cross-section about an axis perpendicular to the axis of the hole,
the substrate is of substantially uniform thickness,
the first and second visible light beams have a substantially uniform energy distribution across the beams and are composed of parallel rays,
the first and second visible light beams have a cross-sectional area larger than the hole, and
the first and second visible light beams are positioned so that the light beams entirely cover the hole.

13. The method of claim 12 wherein
the first and second light beams are laser beams,
the diameter of the hole is less than 1,000 microns, and
the thickness of the substrate is less than 5 millimeters.

14. The method of claim 13 wherein
the hole is an orifice in a spinneret,
the substrate is the face of a spinneret, and
at least a portion of the orifice defines a right circular cylinder passageway which is a capillary of a spinneret orifice.

15. The method of claim 14 wherein
the face of the spinneret is substantially planar, and
the first angle is substantially zero.

16. The method of claim 14 wherein
the shape of the face of the spinneret is a portion of the surface of a sphere, and
the first angle is substantially the same angle as the angle between a perpendicular to the first laser beam and a tangent to a great circle of the sphere.

17. The method of claim 14 wherein
the first and second laser beams are optically positioned upon the capillary of the orifice in the spinneret,
the quantity of energy in the portion of the first laser beam passed through the capillary is sensed and the first signal generated by photoelectrically converting the light energy of the portion of the beam into the first signal which is an electrical signal having a voltage reflective of the magnitude of the sensed quantity of energy,
the quantity of energy in the portion of the second laser beam passed through the capillary is sensed and the third signal generated by photoelectrically converting the light energy of the portion of the beam into the third signal which is an electrical signal having a voltage reflective of the magnitude of the sensed quantity of energy,
the diameter of the capillary is determined by electrically solving the first mathematical correlation by multiplying the square root of the voltage of the first electrical signal by the predetermined constant and generating the second signal which is an electrical signal having a voltage reflective of the magnitude of the diameter of the capillary,
the ratio of the first and third signals are determined and the fourth signal generated by electrically dividing the voltage of either the first or third electrical signal by the voltage of the other electrical signal and generating the fourth signal which is an electrical signal having a voltage reflective of the magnitude of the divided voltages of the first and third signals,
the ratio of the length and diameter of the capillary is determined by electrically solving the second mathematical correlation and the fifth signal generated is an electrical signal having a voltage reflective of the magnitude of the ratio of the length and diameter of the capillary, and
the length of the capillary is determined by electrically multiplying the voltage of the fifth electrical signal by a value selected from the group consisting of a value reflective of a nominal diameter for the capillary and a value reflective of the voltage of the second electrical signal, the voltage of the second electrical signal being reflective of the determined magnitude of the diameter of the capillary,
the method further includes electrically generating a sixth electrical signal having a voltage reflective of the magnitude of the length of the capillary, the method further includes electrically generating a seventh visually displayable signal which is the length of the capillary, the method further includes visually displaying the seventh signal, which is the length of the capillary, the method further includes electrically generating an eighth visually displayable signal which is the diameter of the capillary, and the method further includes visually displaying the eighth signal, which is the diameter of the capillary, in correlation with the seventh signal, which is the length of the capillary.

18. The method of claim 17 further including electrically comparing the voltage of the sixth signal with maximum and minimum voltages reflective of maximum and minimum permissible values for the length of the capillary, electrically generating a visually displayable reject signal when the voltage of the sixth signal is either lower than the minimum voltage or higher than the maximum voltage, visually displaying the reject signal in correlation with the visual display of the sixth signal which is the length of the capillary, electrically comparing the voltage of the second signal with maximum and minimum voltages reflective of maximum and minimum permissible values for the diameter of the capillary, electrically generating a visually displayable reject signal when the voltage of the second signal is either lower than the minimum voltage or higher than the maximum voltage, and visually displaying the reject signal in correlation with the visual display of the eighth signal which is the diameter of the capillary.

19. A method of measuring both the length and the diameter of a capillary of an orifice in a spinneret comprising 1. rotating about its axis a spinneret having a plurality of orifices disposed in a circle substantially concentric to the axis of the spinneret, at least a portion of each orifice defining a right cylinder capillary passageway, 2. generating a first and second laser beam, each beam having a size larger than the size of the capillary, 3. optically dividing the first laser beam into a first reference laser beam and a first measurement laser beam, 4. optically dividing the second laser beam into a second reference laser beam and a second measurement laser beam, 5. optically positioning the first measurement laser beam substantially parallel to the axis of the spinneret and upon an orifice in such a manner that the beam entirely covers the orifice and a portion of the beam passes through the capillary of the orifice, 6. optically positioning the second measurement laser beam at a predetermined angle with regard to the axis of the spinneret and upon the orifice in such a manner that the beam entirely covers the orifice and a postion of the beam passes through the capillary of the orifice, 7. optically radially oscillating the first and second measurement laser beams across the circle defined by the centers of the plurality of orifices, the radial oscillation being at a suitable rate to allow the portion of the first and second beams to substantially simultaneously pass through the capillary of the orifice on at least three consecutive oscillations, 8. sensing the quantity and the nonuniform character of energy in a portion of the first measurement laser beam passed through the capillary of the orifice by photoelectrically converting the light energy of the portion of the beam into a first measurement electrical signal having an oscillatory voltage reflective of the magnitude and nonuniform character of the sensed energy, 9. sensing the quantity and the nonuniform character of energy in the portion of the second measurement laser beam passed through the capillary of the orifice by photoelectrically converting the light energy of the portion of the beam into a second measurement electrical signal having an oscillatory voltage reflective of the magnitude and nonuniform character of the sensed energy, 10. sensing the nonuniform character of the energy in the first reference laser beam and generating a first reference electrical signal having a voltage reflective of the nonuniform character of the sensed energy, 11. sensing the nonuniform character of the energy in the portion of the second reference laser beam and generating a second reference electrical signal having a voltage reflective of the nonuniform character of the sensed energy, 12. electrically dividing the voltage of the first measurement electrical signal by the voltage of the first reference electrical signal, and generating a third electrical signal having an oscillatory uniform voltage reflective of the magnitude of the division, 13. electrically dividing the voltage of the second measurement electrical signal by the voltage of the second reference electrical signal and generating a fourth electrical signal having an oscillatory uniform voltage reflective of the magnitude of the division, 14. sensing the maximum amplitude of the oscillating voltage of the third electrical signal and generating a fifth electrical signal having a voltage which is substantially constant and equal to the amplitude of the maximum voltage oscillation of the third signal, 15. correlating the diameter of the capillary in terms of a predetermined constant multiplied by the square root of the value of the voltage of the fifth electrical signal, 16. electrically determining the diameter of the capillary by determining the square root of the value of the voltage of the fifth electrical signal and multiplying the determined value of the square root of the voltage by the predetermined constant and generating a sixth electrical signal having a voltage reflective of the magnitude of the diameter of the capillary, 17. electrically generating a seventh visually displayable signal which is the value of the diameter of the capillary, 18. visually displaying the seventh signal which is the value of the diameter of the capillary, 19. electrically comparing the voltage of the sixth electrical signal with maximum and minimum voltages reflective of maximum and minimum permissible values for the diameter of the capillary,
20. electrically generating a visually displayed reject signal when the voltage of the sixth signal is either more than the maximum voltage or less than the minimum voltage, and
21. visually displaying the reject signal in correlation with the visual display of the seventh signal which is the value of the diameter of the capillary,
22. sensing the maximum amplitude of the oscillating voltage of the fourth electrical signal and generating an eighth electrical signal having a voltage which is substantially constant and equal to the amplitude of the maximum voltage oscillation of the fourth signal,
23. electrically determining the ratio of the eighth electrical signal to the fifth electrical signal by dividing the voltage of the eighth signal by the voltage of the fifth signal and generating a ninth electrical signal having a voltage reflective of the magnitude of the ratio,
24. mathematically correlating the ratio of the length of the capillary to the diameter of the capillary in terms of a linear approximation of the ratio of the eighth electrical signal to the fifth electrical signal and the predetermined angle of the second measurement laser beam with regard to the axis of the spinneret,
25. electrically determining the ratio of the length of the capillary to the diameter of the capillary by adding a predetermined voltage to the product of the multiplication of the voltage of the ninth electrical signal by a predetermined value and generating a 10th electrical signal having a voltage reflective of the magnitude of the ratio of the length of the capillary to the diameter of the capillary,
26. electrically determining the length of the capillary by multiplying the voltage of the 10th electrical signal by a value selected from the group consisting of a value reflective of the nominal diameter of the capillary and a value reflective of the electrically determined diameter of the capillary and generating an 11th electrical signal reflective of the magnitude of the length of the capillary,
27. using the 11th electrical signal, electrically generating a 12th visually displayable signal which is the value of the length of the capillary,
28. visually displaying the 12th signal which is the value of the length of the capillary,
29. electrically comparing the voltage of the 11th electrical signal with maximum and minimum voltages reflective of maximum and minimum permissible values for the length of the capillary,
30. electrically generating a visually displayable reject signal when the voltage of the 11th signal is either more than the maximum voltage or less than the minimum voltage, and
31. visually displaying the reject signal in correlation with the visual display of the 12th signal which is the value of the length of the capillary.

20. The method of claim 19 wherein
the spinneret is rotated at a rate within the range of 0.1 to 10 revolutions per minute, and
the first and second measurement laser beams are oscillated at a rate in the range of 10 to 1,000 cycles per second.

21. Apparatus for measuring the length of a hole in a substrate comprising
1. a first means to position in a measuring location a substrate having a hole therein,
2. a second means to generate a first and a second electromagnetic beam,
3. a third means to position the first electromagnetic beam at a first angle with regard to the axis of the hole and upon the hole in such a manner that at least a portion of the beam passes through the hole,
4. a fourth means to position the second electromagnetic beam at a second angle with regard to the axis of the hole and upon the hole in such a manner that at least a portion of the beam passes through the hole,
5. a fifth means to sense the quantity of energy in the portion of the first electromagnetic beam passed through the hole and generate a first signal reflective of the magnitude of the sensed quantity of energy,
6. a sixth means to sense the quantity of energy in the portion of the second electromagnetic beam passed through the hole and generate a second signal reflective of the sensed quantity of energy,
7. a seventh means to determine the ratio of the first and second signals and generate a third signal reflective of the magnitude of the ratio of the first and second signals,
8. an eighth means to determine the ratio of the length and diameter of the hole by solving a mathematical correlation of the ratio of the length and diameter of the hole in terms of the magnitude of the ratio of the first and second signals and the relationship between the first and second angle, the eighth means generating a fourth signal reflective of the magnitude of the ratio of the length and diameter,
9. a ninth means to determine the length of the hole by multiplying the fourth signal by a value reflective of a nominal diameter for the hole.

22. The apparatus of claim 21 wherein
the first and second electromagnetic beams are visible light beams,
the hole has a symmetrical cross-section about an axis perpendicular to the axis of the hole,
the substrate is of substantially uniform thickness,
the second means comprises a means to generate a first and a second visible light beam having a substantially uniform energy distribution across the beams and are composed of substantially parallel rays,
the second means comprises a means to generate a first and second visible light beam having a cross-sectional area larger than the hole, and
the third and fourth means comprises a means to position the first and second visible light beams so that the light beams entirely cover the hole.

23. The apparatus of claim 22 wherein
the first and second visible light beams are laser beams,
the diameter of the hole is less than 1,000 microns, and
the thickness of the substrate is less than 5 millimeters.

24. The apparatus of claim 23 wherein
the hole is an orifice in a spinneret, the substrate is the face of a spinneret, and at least a portion of the orifice defines a right circular cylinder passageway which is a capillary of a spinneret orifice.

25. The apparatus of claim 24 wherein
the face of the spinneret is substantially planar, and the first angle is substantially zero.

26. The apparatus of claim 24 wherein
the shape of the face of the spinneret is a portion of the surface of a sphere, and
the first angle is substantially the same angle as the angle between a perpendicular to the first laser beam and a tangent to a great circle of the sphere drawn through the axis of the capillary.

27. The apparatus of claim 24 wherein
the third means comprises an optical means,
the fourth means comprises an optical means, and
the fifth means comprises a pholoelectric means to sense the quantity of energy in the portion of the first laser beam passed through the capillary and generate the first signal comprising an electrical signal having a voltage reflective of the magnitude of the sensed quantity of energy,
the sixth means comprises a photoelectric means to sense the quantity of energy in the portion of the second laser beam passed through the capillary and generate the second signal comprising an electrical signal having a voltage reflective of the magnitude of the sensed quantity of energy,
the seventh means comprises an electric means to electrically divide the voltage of either the first or second electrical signal by the voltage of the other electrical signal and generate the third signal comprising an electrical signal having a voltage reflective of the magnitude of the divided voltages of the first and second signals,
the eighth means comprises an electric means to solve the mathematical correlation and generate the fourth signal comprising an electrical signal having a voltage reflective of the magnitude of the ratio of the length and diameter of the capillary, and
the ninth means comprises an electric means to multiply the voltage of the fourth electrical signal by a value reflective of a nominal diameter for the capillary,
the apparatus further includes a 10th means to electrically generate a fifth electrical signal having a voltage reflective of the magnitude of the length of the capillary,
the apparatus further includes an 11th means to electrically generate a sixth visually displayable signal which is the length of the capillary, and
the apparatus further includes a 12th means to visually display the sixth signal which is the length of the capillary.

28. The apparatus of claim 27 further including
a means to electrically compare the voltage of the fifth signal with maximum and minimum voltages reflective of maximum and minimum permissible values for the length of the capillary,
a means to electrically generate a visually displayable reject signal when the voltage of the fifth signal is either lower than the minimum voltage or higher than the maximum voltage, and a means to visually display the reject signal in correlation with the visual display of the sixth signal which is the length of the capillary.

29. Apparatus for measuring the length of a capillary of an orifice in a spinneret comprising 1. a rotatably mounted member adapted to retain a spinneret and axially rotate the spinneret about the axis of the spinneret, the spinneret having a plurality of orifices disposed in a circle substantially concentric to the axis of the spinneret, at least a portion of each orifice defining a right circular cylinder capillary passageway,
2. a means to rotate the rotatably mounted member comprising an electric motor mechanically engaged to the member,
3. a means to generate a first laser beam having a size larger than the size of the capillary,
4. a means to generate a second laser beam having a size larger than the size of the capillary,
5. a first optical reflecting means residing within the path of the first laser beam to reflecting a portion of the first laser beam away from the path of the first laser beam to form a first reference laser beam, the means allowing the remaining portion of the first laser beam to pass through the means to form a first measurement laser beam,
6. a second optical reflecting means residing within the path of the second laser beam to reflect a portion of the second laser beam away from the path of the beam to form the second reference laser beam, the means allowing the remaining portion of the second laser beam to pass through the means to form the second measurement laser beam,
7. third optical reflecting means, residing in the path of the first measurement laser beam, to reflect the first measurement laser beam substantially parallel to the axis plane of the spinneret and upon an orifice in such a manner that the beam entirely covers the orifice and a portion of the beam passes through the capillary of the orifice, the third optical reflecting means being attached to an axially oscillable shaft positioned so as to oscillate the reflected beam radially across the circle defined by the centers of the plurality of orifices of the spinneret, 8. a fourth optical reflecting means, residing in the path of the second measurement laser beam, the means attached to the axially oscillable shaft so as to reflect the second measurement laser beam at a predetermined angle with regard to an axis plane of the spinneret and upon the orifice in such a manner that the beam entirely covers the orifice and a portion of the beam passes through the capillary of the orifice,
9. a means to oscillate the axially oscillable shaft at a rate to allow the portion of the first and second beams to simultaneously pass through the capillary of the orifice on at least three consecutive oscillations,
10. a first photoelectric means to sense the quantity and the nonuniform character of energy in the portion of the first measurement laser beam passed through the capillary of the orifice and convert the energy of the light in the portion of the beam into a first measurement electrical signal having an oscillatory voltage reflective of the magnitude and nonuniform character of the sensed energy, 11. a second photoelectric means to sense the quantity and the nonuniform character of energy in the portion of the second measurement laser beam passed through the capillary of the orifice and convert the energy of the light in the portion of the beam into a second measurement electrical signal having an oscillatory voltage reflective of the magnitude and nonuniform character of sensed the energy, 12. a third photoelectric means, residing in the path of the first reference laser beam, to sense the nonuniform character of the energy in the first reference laser beam and generate a first reference electrical signal having a voltage reflective of the nonuniform character of the sensed energy, 13. a fourth photoelectric means, residing in the path of the second reference laser beam to sense the nonuniform character of the energy in the portion of the second reference laser beam and generate a second reference electrical signal having a voltage reflective of the nonuniform character of the sensed energy, 14. an electrical means to electrically divide the voltage of the first measurement electrical signal by the voltage of the first reference electrical signal, and generate a third electrical signal having an oscillatory uniform voltage reflective of the magnitude of the division, 15. an electrical means to electrically divide the voltage of the second measurement electrical signal by the voltage of the second reference electrical signal and generate a fourth electrical signal having an oscillatory uniform voltage reflective of the magnitude of the division, 16. a means to sense the maximum amplitude of the oscillating voltage of the third electrical signal and generate a fifth electrical signal having a voltage which is substantially constant and equal to the amplitude of the maximum voltage oscillation of the third signal, 17. a means to sense the maximum amplitude of the oscillating voltage of the fourth electrical signal and generate a sixth electrical signal having a voltage which is substantially constant and equal to the amplitude of the maximum voltage oscillation of the fourth signal, 18. a means to electrically determine the ratio of the sixth electrical signal to the fifth electrical signal by dividing the voltage of the sixth signal by the voltage of the fifth signal and generate a seventh electrical signal having a voltage reflective of the magnitude of the ratio, 19. a means to electrically determine the ratio of the length of the capillary to the diameter of the capillary by adding a predetermined voltage to the product of the multiplication of the voltage of the seventh electrical signal by a predetermined value and generate an eighth electrical signal having a voltage reflective of the magnitude of the ratio of the length of the capillary to the diameter of the capillary, 20. a means to electrically determine the length of the capillary by multiplying the voltage of the eighth electrical signal by a value reflective of the nominal diameter of the capillary and generate a ninth electrical signal reflective of the magnitude of the length of the capillary, 21. a means to electrically generate a tenth visually displayable signal which is the value of the length of the capillary, 22. a means to visually displaying the tenth signal which is the value of the length of the capillary, 23. a means electrically compare the voltage of the ninth electrical signal with maximum and minimum voltages reflective of maximum and minimum permissible values for the length of the capillary, 24. a means to electrically generate a visually displayable reject signal when the voltage of the ninth signal is either more than the maximum voltage or less than the minimum voltage, and 25. a means to visually display the reject signal in correlation with the visual display of the 10 signal which is the value of the length of the capillary.

30. Apparatus for measuring both the length and the diameter of a hole in a substrate comprising 1. a first means to position in a measuring location a substrate having a hole therein, 2. a second means to generate a first and a second electromagnetic beam, 3. a third means to position the first electromagnetic beam at a first angle with regard to the axis of the hole and upon the hole in such a manner that at least a portion of the beam passes through the hole, 4. a fourth means to position the second electromagnetic beam at a second angle with regard to the axis of the hole and upon the hole in such a manner that at least a portion of the beam passes through the hole, 5. a fifth means to sense the quantity of energy in the portion of the first electromagnetic beam passed through the hole and generate a first signal reflective of the magnitude of the sensed quantity of energy, 6. a sixth means to determine the diameter of the hole by solving a mathematical correlation for the diameter of the hole in terms of a predetermined constant multiplied by the square root of the sensed quantity of energy in the portion of the first electromagnetic beam passed through the hole, the sixth means generating a second signal reflective of the magnitude of the diameter of the hole, 7. a seventh means to sense the quantity of energy in the portion of the second electromagnetic beam passed through the hole and generate a third signal reflective of the sensed quantity of energy, 8. an eighth means to determine the ratio of the first and third signals and generate a fourth signal reflective of the magnitude of the ratio of the first and third signals, 9. a ninth means to determine the ratio of the length and diameter of the hole by solving a mathematical correlation of the ratio of the length and diameter of the hole in terms of the magnitude of the ratio of the first and third signals and the relationship between the first and second angle, the eighth means generating a fifth signal reflective of the magnitude of the ratio of the length and diameter, and 10. a 10 means to determine the length of the hole by multiplying the fifth signal by a value selected from the group consisting of a value reflective of a nominal diameter for the hole and the value of the second signal, the voltage of the second electrical signal being reflective of the determined magnitude of the diameter of the capillary.

31. The apparatus of claim 30 wherein
the first and second electromagnetic beams are visible light beams,
the hole has a symmetrical cross-section about an axis perpendicular to the axis of the hole,
the substrate is of substantially uniform thickness,
the second means comprises a means to generate a first and a second visible light beam having a substantially uniform energy distribution across the beams and are composed of parallel rays,
the second means comprises a means to generate a first and second visible light beam having a cross-sectional area larger than the hole, and
the third and fourth means comprises a means to position the first and second visible light beams so that the light beams entirely cover the hole.

32. The apparatus of claim 31 wherein
the first and second visible light beams are laser beams,
the diameter of the hole is less than 1,000 microns, and
the thickness of the substrate is less than 5 millimeters.

33. The apparatus of claim 32 wherein
the hole is an orifice in a spinneret,
the substrate is the face of a spinneret, and
at least a portion of the orifice defines a right circular cylinder passageway which is a capillary of a spinneret orifice.

34. The apparatus of claim 33 wherein
the face of the spinneret is substantially planar, and
the first angle is substantially zero.

35. The apparatus of claim 33 wherein
the shape of the face of the spinneret is a portion of the surface of a sphere, and
the first angle is substantially the same angle as the angle between a perpendicular to the first laser beam and a tangent to a great circle of the sphere drawn through the axis of the capillary.

36. The apparatus of claim 33 wherein
the third means comprises an optical means,
the fourth means comprises an optical means,
the fith means comprises a pholoelectric means to sense the quantity of energy in the portion of the first laser beam passed through the capillary and generate the first signal comprising an electrical signal having a voltage reflective of the magnitude of the sensed quantity of energy,
the sixth means comprises an electric means to electrically determine the square root of the voltage of the first electrical signal and multiply the determined voltage by the predetermined constant and generate the second signal comprising an electrical signal having a voltage reflective of the magnitude of the diameter of the hole,
the seventh means comprises a photoelectric means to sense the quantity of energy in the portion of the second laser beam passed through the capillary and generate the third signal comprising an electrical signal having a voltage reflective of the magnitude of the sensed quantity of energy,
the eighth means comprises an electric means to electrically divide the voltage of either the first or second electrical signal by the voltage of the other electrical signal and generate the fourth signal comprising an electrical signal having a voltage reflective of the magnitude of the divided voltages of the first and second signals,
the ninth means comprises an electric means to solve the mathematical correlation and generate the fifth signal comprising an electrical signal having a voltage reflective of the magnitude of the ratio of the length and diameter of the capillary, and
the 10 means comprises an electric means to multiply the voltage of the fifth electrical signal by a value selected from the group consisting of a value reflective of a nominal diameter for the capillary and the value of the second electrical signal, the voltage of the second electrical signal being reflective of the determined magnitude of the diameter of the capillary,
the apparatus further includes an 11th means to electrically generate a seventh visually displayable signal which is the length of the capillary, and
the apparatus further includes a 12th means to visually display the seventh signal which is the length of the capillary,
the apparatus further includes a 13th means to electrically generate an eighth electrical signal having a voltage reflective of the magnitude of the diameter of the capillary,
the apparatus further includes a 14th means to electrically generate a ninth visually displayable electrical signal which is the diameter of the capillary, and
the apparatus further includes a 15th means to visually display the ninth signal which is the diameter of the capillary.

37. The apparatus of claim 36 further including
a means to electrically compare the voltage of the sixth signal with maximum and minimum voltages reflective of maximum and minimum permissible values for the length of the capillary,
a means to electrically generate a visually displayable reject signal when the voltage of the sixth signal is either lower than the minimum voltage or higher than the maximum voltage,
a means to visually display the reject signal in correlation with the visual display of the seventh signal which is the length of the capillary,
a means to electrically compare the voltage of the eighth electrical signal with maximum and minimum voltages reflective of maximum and minimum permissible values for the diameter of the capillary, a means to electrically generate a visually displayable reject signal when the voltage of the eighth signal is either lower than the minimum voltage or higher than the maximum voltage, and
a means to visually display the reject signal in correlation with the visual display of the ninth signal which is the diameter of the capillary.

38. Apparatus for measuring both the length and the diameter of a capillary of an orifice in a spinneret comprising
  1. a rotatably mounted member adapted to retain a spinneret and axially rotate the spinneret about the axis of the spinneret, the spinneret having a plurality of orifices disposed in a circle substantially concentric to the axis of the spinneret, each orifice defining a frusto conical passageway communicating with a right circular cylinder capillary passageway the larger end of the frusto conical passageway being oriented in the upstream position,
2. a means to rotate the rotatably mounted member comprising an electric motor mechanically engaged to the member,
3. a means to generate a first laser beam having a size larger than the size of the larger upstream end of the frustro-conical passageway of the orifice of the spinneret,
4. a means to generate a second laser beam having a size larger than the size of the capillary,
5. a first optical reflective means residing within the path of the first laser beam to reflecting a portion of the first laser beam away from the path of the first laser beam to form a first reference laser beam, the means allowing the remaining portion of the first laser beam to pass through the means to form a first measurement laser beam,
6. a second optical reflecting means residing within the path of the second laser beam to reflect a portion of the second laser beam away from the path of the beam to form the second reference laser beam, the means allowing the remaining portion of the second laser beam to pass through the means to form the second measurement laser beam,
7. third optical reflecting means, residing in the path of the first measurement laser beam, to reflect the first measurement laser beam substantially parallel to the axis of the spinneret and upon an orifice in such a manner that the beam entirely covers the orifice and a portion of the beam passes through the capillary of the orifice, the third optical reflecting means being attached to an axially oscillable shaft positioned so as to oscillate the reflected beam radially across the circle defined by the center of the plurality of orifices of the spinneret,
8. a fourth optical reflecting means, residing in the path of the second measurement laser beam, the means attached to the axially oscillable shaft so as to reflect the second measurement laser beam at a predetermined angle with regard to the axis of the spinneret and upon the orifice in such a manner that beam entirely covers the orifice and a portion of the beam passes through the capillary of the orifice,
9. a means to oscillate the axially oscillable shaft at a rate to allow the portion of the first and second beams to substantially simultaneously pass through the capillary of the orifice on at least three consecutive oscillations,
10. a first photoelectric means to sense the quantity and the nonuniform character of energy in the portion of the first measurement laser beam passed through the capillary of the orifice and convert the energy of the light in the portion of the beam into a first measurement electrical signal having an oscillatory voltage reflective of the magnitude and nonuniform character of the sensed energy,
11. a second photoelectric means to sense the quantity and the nonuniform character of energy in the portion of the second measurement laser beam passed through the capillary of the orifice and convert the energy of the light in the portion of the beam into a second measurement electrical signal having an oscillatory voltage reflective of the magnitude and nonuniform character of the sensed energy,
12. a third photoelectric means, residing in the path of the first reference laser beam, to sense the nonuniform character of the energy in the first reference laser beam and generate a first reference electrical signal having a voltage reflective of the nonuniform character of the sensed energy,
13. a fourth photoelectric means, residing in the path of the second reference laser beam to sense the nonuniform character of the energy in the portion of the second reference laser beam and generate a second reference electrical signal having a voltage reflective of the nonuniform character of the sensed energy.
14. an electrical means to electrically divide the voltage of the first measurement electrical signal by the voltage of the first reference electrical signal, and generate a third electrical signal having an oscillatory uniform voltage reflective of the magnitude of the division,
15. an electrical means to electrically divide the voltage of the second measurement electrical signal by the voltage of the second reference electrical signal and generate a fourth electrical signal having an oscillatory uniform voltage reflective of the magnitude of the division,
16. a means to sense the maximum amplitude of the oscillating voltage of the third electrical signal and generate a fifth electrical signal having a voltage which is substantially constant and equal to the amplitude of the maximum voltage oscillation of the third signal.
17. a means to electrically determine the diameter of the capillary by determing the square root of the voltage of the fifth electrical signal and multiplying the determined value of the square root of the voltage by a predetermined constant, the means generating a sixth electrical signal having a voltage reflective of the diameter of the capillary,
18. a means to electrically generate a seventh visually displayable signal which is the value of the diameter of the capillary,
19. a means to visually display the seventh signal which is the value of the diameter of the capillary, 20. a means to electrically compare the voltage of the sixth electrical signal with maximum and minimum voltages reflective of maximum and minimum permissible values for the diameter of the capillary,
21. a means to electrically generate a visually displayable reject signal when the voltage of the sixth signal is either less than the maximum voltage or more than the maximum voltage, and
22. a means to visually display the reject signal in correlation with the visual display of the seventh signal which is the value of the diameter of the capillary, 23. a means to sense the maximum amplitude of the oscillating voltage of the fourth electrical signal and generate an eighth electrical signal having a voltage which is substantially constant and equal to the amplitude of the maximum voltage oscillation of the fourth signal,
24. a means to electrically determine the ratio of the eighth electrical signal to the fifth electrical signal by dividing the voltage of the eighth signal by the voltage of the fifth signal and generate a ninth electrical signal having a voltage reflective of the magnitude of the ratio,
25. a means to electrically determine the ratio of the length of the capillary to the diameter of the capillary by adding a predetermined voltage to the product of the multiplication of the voltage of the ninth electrical signal by a predetermined value and generate a tenth electrical signal having a voltage reflective of the magnitude of the ratio of the length of the capillary to the diameter of the capillary,
26. a means to electrically determine the length of the capillary by multiplying the voltage of the 10th electrical signal by a value selected from the group consisting of a value reflective of the nominal diameter of the capillary and a value reflective of the electrically determined diameter of the capillary, and generate an 11th electrical signal reflective of the magnitude of the length of the capillary,
27. a means to electrically generate a 12th visually displayable signal which is the value of the length of the capillary,
28. a means to visually display the 12th signal which is the value of the length of the capillary,
29. a means to electrically compare the voltage of the 11th electrical signal with the maximum and minimum voltages reflective of maximum and minimum permissible values for the length of the capillary,
30. a means to electrically generate a visually displayable reject signal when the voltage of the 11th signal is either less than the maximum voltage or more than the maximum voltage, and
31. a means to visually display the reject signal in correlation with the visual display of the 12th signal which is the value of the length of the capillary.

* * * * *